(12) United States Patent
Lee et al.

(10) Patent No.: US 9,363,106 B2
(45) Date of Patent: Jun. 7, 2016

(54) APPARATUS AND METHOD FOR PROVIDING CONTACTS THROUGH INTERWORKING BETWEEN MESSAGING SERVICE AND SOCIAL NETWORK SERVICE

(75) Inventors: Kyung-Tak Lee, Yongin-si (KR); Gyu-Bong Oh, Suwon-si (KR); Wuk Kim, Anyang-si (KR); Seung-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 13/582,638

(22) PCT Filed: Mar. 2, 2011

(86) PCT No.: PCT/KR2011/001436
§ 371 (c)(1),
(2), (4) Date: Sep. 4, 2012

(87) PCT Pub. No.: WO2011/108844
PCT Pub. Date: Sep. 9, 2011

(65) Prior Publication Data
US 2012/0324009 A1    Dec. 20, 2012

(30) Foreign Application Priority Data
Mar. 2, 2010    (KR) .................. 10-2010-0018734

(51) Int. Cl.
*H04W 4/20* (2009.01)
*H04L 12/58* (2006.01)
(Continued)

(52) U.S. Cl.
CPC .............. *H04L 12/588* (2013.01); *H04L 51/28* (2013.01); *H04L 51/32* (2013.01); *H04W 4/12* (2013.01); *H04W 4/206* (2013.01); *H04W 8/18* (2013.01)

(58) Field of Classification Search
None
See application file for complete search history.

(56) References Cited

U.S. PATENT DOCUMENTS 7,525,951 B2 *   4/2009   Musil et al. ................. 370/352
2005/0021750 A1   1/2005   Abrams
(Continued)

FOREIGN PATENT DOCUMENTS

JP    2007-193611 A    8/2007
JP    2009-540415 A    11/2009
(Continued)

OTHER PUBLICATIONS

Acme Packet, "Rich Communications Suite", Solution Brief, Feb. 23, 2012, Bedford, MA, USA.
(Continued)

*Primary Examiner* — Nicholas Taylor
*Assistant Examiner* — Clayton R Williams
(74) *Attorney, Agent, or Firm* — Jefferson IP Law, LLP

(57) ABSTRACT

A method and an apparatus for providing a contact through interworking with a Social Network Service (SNS) are provided. The method includes receiving, by a client using the other service through SNS interworking, a contact provided in the SNS, determining whether the other party's client having subscribed to the same service as that of the client is present in the received contact, and informing a user of the determination results. Based on the determination results, the client may determine subscription/non-subscription of the other party's client to the service, and may send an invite request for the service if the other party's client has not subscribed to the same service as that of the client. By doing so, the number of targets, subscription/non-subscription of which to a specific service can be determined, may be extended.

31 Claims, 18 Drawing Sheets

(51) Int. Cl.
*H04W 8/18* (2009.01)
*H04W 4/12* (2009.01)

(56) References Cited

U.S. PATENT DOCUMENTS

| | | |
|---|---|---|
| 2006/0074932 A1 | 4/2006 | Fong et al. |
| 2008/0005263 A1 | 1/2008 | Baraev et al. |
| 2008/0147743 A1 | 6/2008 | Taylor et al. |
| 2008/0292080 A1 | 11/2008 | Quon et al. |
| 2009/0138475 A1 | 5/2009 | Caulkins |
| 2009/0157732 A1* | 6/2009 | Hao et al. ............. 707/102 |
| 2009/0280786 A1* | 11/2009 | Ziklik ................... 455/415 |
| 2009/0298489 A1 | 12/2009 | Chitturi et al. |
| 2009/0319288 A1 | 12/2009 | Slaney et al. |
| 2010/0036912 A1 | 2/2010 | Rao |
| 2010/0077027 A1* | 3/2010 | Chitturi et al. ......... 709/203 |
| 2010/0199340 A1* | 8/2010 | Jonas et al. ............... 726/8 |
| 2011/0078190 A1* | 3/2011 | Samuel et al. ......... 707/780 |
| 2011/0145270 A1* | 6/2011 | Christopher et al. ... 707/769 |
| 2011/0167114 A1* | 7/2011 | Blanchard et al. ..... 709/204 |
| 2011/0211813 A1* | 9/2011 | Marks .................... 386/297 |

FOREIGN PATENT DOCUMENTS

| | | |
|---|---|---|
| KR | 10-2006-0087068 A | 8/2006 |
| KR | 10-2009-0077079 A | 7/2009 |
| KR | 10-2009-0103594 A | 10/2009 |
| WO | 2006/104706 A2 | 10/2006 |

OTHER PUBLICATIONS

A. B. Roach, "Session Initiation Protocol (SIP)—Specific Event Notification", Network Working Group, Jun. 2002.

J. Rosenberg, "The Extensible Markup Language (XML) Configuration Access Protocol (XCAP)", Network Working Group, May 2007.

"SyncML Representation Protocol, Data Synchronization Usage", Open Mobile Alliance, Version 12.1, Aug. 10, 2007.

"Converged Address Book Architecture", Open Mobile Alliance, Version 1.0, Sep. 22, 2009.

"Presence Simple Specification", Open Mobile Alliance, Version 1.1.1, Feb. 25, 2010.

* cited by examiner

APPARATUS AND METHOD FOR PROVIDING CONTACTS THROUGH INTERWORKING BETWEEN MESSAGING SERVICE AND SOCIAL NETWORK SERVICE

PRIORITY

This application is a National Stage application under 35 U.S.C. §371 of an International application filed on Mar. 2, 2011 and assigned application No. PCT/KR2011/001436, and claims the benefit under 35 U.S.C. §365(b) of a Korean patent application filed on Mar. 2, 2010 in the Korean Intellectual Property Office and assigned Serial No. 10-2010-0018734, the entire disclosure of which is hereby incorporated by reference.

BACKGROUND OF THE INVENTION

1. Field of the Invention

The present invention relates to a messaging service apparatus and method More particularly, the present invention relates to an apparatus and method for providing contacts through interworking between a messaging service and a Social Network Service (SNS).

2. Description of the Related Art

A mobile communication terminal is a means of providing and exchanging necessary information anywhere and anytime. A mobile terminal of the related art is used simply for voice calls. However, with the increasing prevalence of mobile communication terminals, the features of conversation and information exchange through texts and multiple media have become important. In line with this trend, various messaging services, such as a Short Message Service (SMS), a Multimedia Messaging Service (MMS), and MicroSoft™ Network (MSN), and various SNS services, such as Facebook™ and Twitter™, have been provided.

Although such various services have been provided based on different technologies, users may be provided with duplicate features and user experiences even though they use different services. In addition, because each service has its own features distinguishable from other services, a user should subscribe to every service in order to experience all the features, causing many burdens.

In order to minimize the user burdens, new services integrating such various user experiences have been introduced and standardized. Typically, these new services may include Open Mobile Alliance (OMA) Converged IP Messaging (CPM) and Global System for Mobile communication Association (GSMA) Rich Communication Suite (RCS). Because these messaging services use different address books, there is a need for management of the address books. To meet the need, OMA has proposed OMA Converged Address Book (CAB). The OMA CAB enables the services to manage a variety of information with an improved network address book using the network storage, and to share inter-group information.

In a case of the messaging service of the related art among the newly introduced services, even though a user has subscribed to a specific service, if the other party has not subscribed to the specific service or other compatible services, conversation and information exchange through the specific service may not be possible. Taking this into consideration, an RCS service provides an address book management function, and may provide a function of notifying subscription/non-subscription to the RCS service. However, since even the RCS service does not share address books with other services, subscription/non-subscription to the RCS service may be notified only to the address book used in the RCS service. Therefore, if it interworks with the SNS, the messaging service may be provided with an extended address book, extending the number of targets (or contacts), subscription/non-subscription of which to the service can be (or is desired to be) determined.

Therefore, a need exists for a method capable of extending the number of targets, subscription/non-subscription of which to a specific service can be determined.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for providing contacts through interworking between a messaging service and a Social Network Service (SNS), capable of extending the number of targets (or contacts), subscription/non-subscription of which to a specific service can be determined.

In accordance with an aspect of the present invention, a method for receiving a contact in a client terminal through interworking between a messaging service and an SNS is provided. The method includes sending a server a request for a contact profile list provided in the SNS, receiving from the server the contact profile list, which is one of a plurality of contact profile lists corresponding to the request and filtered by the server, and determining whether each contact in the received contact profile list has subscribed to the same service as that of the client terminal.

In accordance with another aspect of the present invention, a client terminal for receiving a contact through interworking between a messaging service and an SNS is provided. The client terminal includes a controller for sending a server a request for a contact profile list provided in the SNS, for receiving from the server the contact profile list, which is one of a plurality of contact profile lists corresponding to the request and filtered by the server, and for determining whether each contact in the received contact profile list has subscribed to the same service as that of the client terminal, an Input/Output (I/O) interface for exchanging a request and a response with the server, a memory for temporarily storing the received contact profile list, an address book manager for storing an address book synchronized with the server, and a user interface for informing a user whether a specific contact has subscribed to the same service as that of the user.

In accordance with another aspect of the present invention, a method for providing a contact to a client terminal in a server through interworking between a messaging service and an SNS is provided. The method includes receiving a client requirement for a contact profile list provided in the SNS, examining the received client requirement, sending a contact list request using the SNS, receiving a contact list in response to the contact list request, filtering a contact corresponding to the examined requirement by comparing the received contact list with an existing contact, and providing the filtered contact.

In accordance with another aspect of the present invention, a server for providing a contact to a client terminal through interworking between a messaging service and an SNS is provided. The server includes a controller for receiving a client requirement for a contact profile list provided in the SNS, for examining the received client requirement, for sending a contact list request using the SNS, for receiving a contact list in response to the contact list request, for filtering a contact corresponding to the examined requirement by comparing the received contact list with an existing contact, and for providing the filtered contact, and an I/O interface for transmitting the request and for receiving a response to the request.

In accordance with exemplary embodiments of the present invention, an extended address book can be provided for extending the number of targets (or contacts), subscription/non-subscription of which to a specific service can be determined. Accordingly, a user can be automatically provided with new contacts which are not in his or her address book, and thus can easily make contact not only with the friends and family members in the address book, but also with the contacts, who are related to his or her profile, but whom he or she is not aware of In addition, when having newly subscribed to a specific service, the user can enjoy the service right away, enhancing user conveniences. For example, if the service provider sends a join invite message, the user may not be interested in it. However, if a senior of a specific school finds an address of his or her school junior through the system proposed by the present invention and sends a join invite message to him or her, then the junior is highly likely to join the service. Taking this into consideration, the service provider may easily induce many users having not subscribed to its service to subscribe to the service, contributing to a sharp increase in the number of its service subscribers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
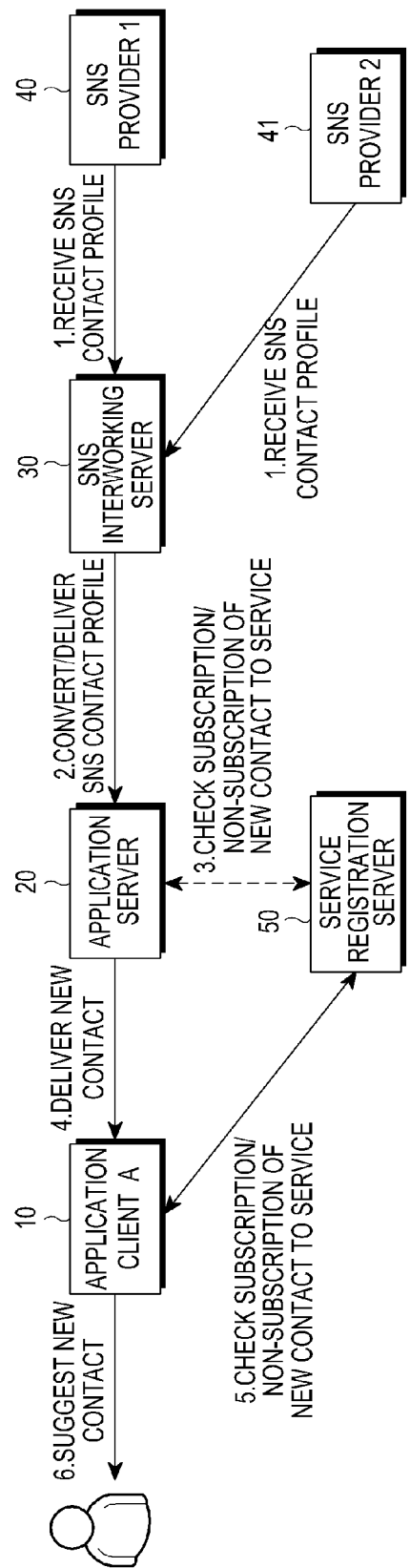
FIG. 1 is a diagram illustrating a system configuration for providing new contacts according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In exemplary embodiments of the present invention, the terms of entities defined in Converged Address Book (CAB) of Open Mobile Alliance (OMA) and Rich Communication Suite (RCS) of Global System for Mobile communication Association (GSMA) will be used herein. However, the use of such standards and terms is not intended to limit the scope of the present invention, and the present invention may be applied to any system having a similar technical background.

Exemplary embodiments of the present invention provide a method for providing contacts through interworking with a Social Network Service (SNS). To this end, exemplary embodiments of the present invention include a process in which a client using the other service through interworking with an SNS is provided with a contact provided in the SNS, and a process in which the client determines whether the other party's client having subscribed to the same service as that of the client itself is present in the provided contact, and notifies its user of the determination results. Based on the determination results, a client using the other service may determine whether the other party's client has subscribed to the desired service, and may send an invite request for the service if the other party's client has not subscribed to the same service as that of the client itself By doing so, it is possible to extend the number of targets (or contacts), subscription/non-subscription of which to a specific service can be (or is desired to be) determined.

A system configuration for providing contacts, in which the above-described function is implemented, will be described with reference to FIG. 1 according to an exemplary embodiment of the present invention.

FIGS. 1 through 13B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a system configuration for providing new contacts according to an exemplary embodiment of the present invention.

Referring to FIG. 1, an application client A 10 is an application messaging service program running in a user terminal, also known as a User Equipment (UE) or a Mobile Station (MS). The application client A 10 delivers user requirements to an application server 20 in the network, and informs its user of the event and/or message received from the application server 20 or a service registration server 50. As an example of the application messaging service, an RCS service will be described in exemplary embodiments of the present invention. The application client A 10 may serve as a CAB or a Presence client.

The application server 20 handles the user requirements received from the application client A 10. The application server 20 delivers the event and/or message received from an SNS interworking server 30 or the other network to the application client A 10.

The SNS interworking server 30 serves as a gateway connecting the application server 20 to its SNS provider 40, and also serves as an important intermediary offering appropriate format conversion between the application server 20 and the SNS provider 40. The SNS interworking server 30 may be disposed in the same place as that of the application server 20, or may be provided as an internal component of the application server 20.

SNS providers 40 and 41 are agencies offering SNSs, such as Facebook™ and Twitter™.

The service registration server 50 is a server that handles and manages registration of all services.

Figure 2:
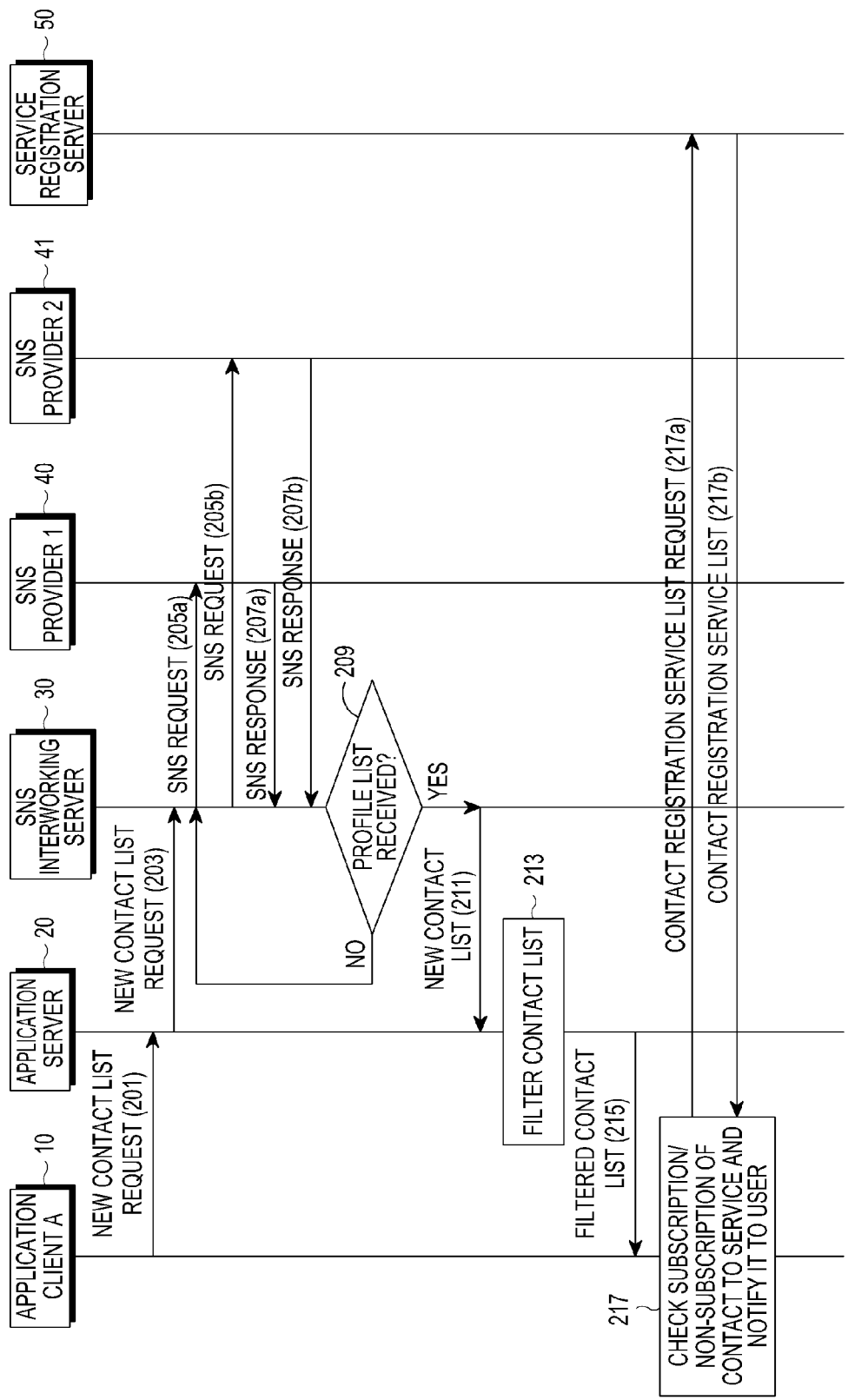
FIG. 2 is a flow diagram illustrating a process of providing contacts through a Social Network Service (SNS) interworking according to an exemplary embodiment of the present invention.

FIG. 2 is a flow diagram illustrating a process of providing contacts through an SNS interworking according to an exemplary embodiment of the present invention.

In FIG. 2, it is assumed that a user A's terminal, i.e., the application client A 10, has subscribed to both a service M and an SNS service. Accordingly, there are login and password of the user A accessible to the SNS service, and the SNS interworking server 30 has logged in the SNS providers 40 and 41 on behalf of the user A, and is accessible thereto. It is also assumed that if the SNS interworking server 30 cannot directly log in the SNS providers 40 and 41, it performs the login by requesting the user A to log in the SNS service providers 40 and 41 through the application client A 10.

Referring to FIG. 2, the application client A 10 sends a request for a new contact list to the application server 20 in step 201. The request for a new contact list may be made when the user A runs the application client A 10 or accesses the service M. This request is made to request a new contact profile list meeting a relevant condition to determine the presence/absence of a contact having the same characteristics as the user A, for example, a contact corresponding to the friend who has the same other contact and/or the same graduate school as the user A. The new contact profile includes a name, an e-mail address, a phone number, and the like.

Thereafter, the application server 20 forwards the request to the SNS interworking server 30 in step 203. In response thereto, the SNS interworking server 30 sends a request for at least one requirement to the SNS providers 40 and 41 to meet the request from the application server 20 in steps 205a and 205b. Thereafter, upon receiving responses to the requests from the SNS providers 40 and 41 in steps 207a and 207b, the SNS interworking server 30 determines in step 209 whether a profile list has been received.

More specifically, the SNS interworking server 30 determines whether the received response(s) is the new contact profile list requested by the application server 20, and if not so, the SNS interworking server 30 returns to steps 205a and 205b and sends the next request to the SNS providers 40 and 41. On the other hand, upon receiving the requested new contact profile list in response to the request, the SNS interworking server 30 proceeds to step 211. For example, if the SNS interworking server 30 receives only a contact Identification (ID) list and fails to receive the detailed profile, such as a name, an e-mail address and a phone number in step 209, the SNS interworking server 30 re-sends the request to the SNS providers 40 and 41, determining that the received response is not a new contact profile list.

Upon receiving the new contact profile list in this way, the SNS interworking server 30 forwards the received new contact profile list to the application server 20 in step 211. The application server 20 filters or extracts only the contacts valid for the user A from each of the received contact profiles in step 213. An address book of the user A is stored even in the network, and the application server 20 may access the address book. Accordingly, the application server 20 may perform contact filtering, and a description thereof will be provided below with reference to FIG. 4.

Thereafter, the application server 20 sends the filtered contact list to the application client A 10 in step 215. In step 217, the application client A 10 determines whether each received contact has subscribed to the service M, and informs its user of the determination results. A description of the process of determining whether the contact has subscribed to the service, and informing the user of the determination results will be provided below with reference to FIG. 6.

If the application client A 10 sends a request for a contact registration service list to the service registration server 50 in step 217a, in order to determine to which service M which contact has subscribed, and the service registration server 50 sends a service list registered to correspond to the contact to the application client A 10 in step 217*b*. Accordingly, the user A may be provided with an already connected SNS friend(s), or an SNS contact whose characteristics are consistent with the user, and may also be provided with the fact that the contact has subscribed to the service M, and with the method capable of connecting with the contact through the service. In addition, if the provided contact has not subscribed to the service M or its subscription/non-subscription is unknown, even though information only about the contact is provided, the user A may send an invite message for subscription to the service M to the other party's client corresponding to the contact, if needed.

Prior to a description of an operation of an application server performing contact filtering, an exemplary internal structure of the application server will be described below with reference to FIG. 3.

Figure 3:
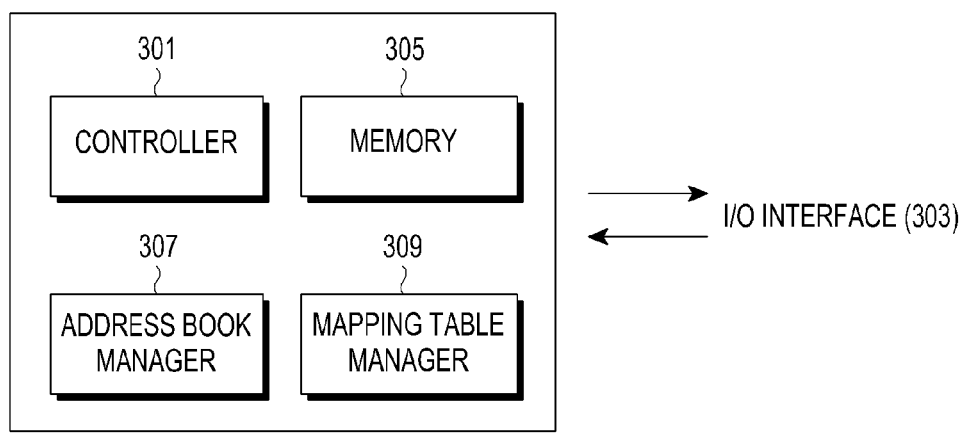
FIG. 3 is a block diagram illustrating an internal structure of an application server according to an exemplary embodiment of the present invention.

FIG. 3 is a block diagram illustrating an internal structure of an application server according to an exemplary embodiment of the present invention.

Referring to FIG. 3, a controller 301 controls the overall operation of the application server 20, and informs when and what it should perform, in cooperation with other internal components. An Input/Output (I/O) interface 303 is used to exchange information with other system entities, and a memory 305 is a storage unit in which processing data is temporarily stored when the application server 20 performs its operations. An address book manager 307 stores the existing contact information of a user(s), and also stores an address book synchronized with an address book manager 507 of FIG. 5 used in the application client 10. A mapping table manager 309 translates the existing addresses/numbers, such as e-mail addresses and phone numbers into specific addresses used for a service M, e.g., Session Initiation Protocol (SIP) Uniform Resource Identifier (URI). The address book manager 307 and the mapping table manager 309 may be implemented out of the application server 20.

Figure 4:
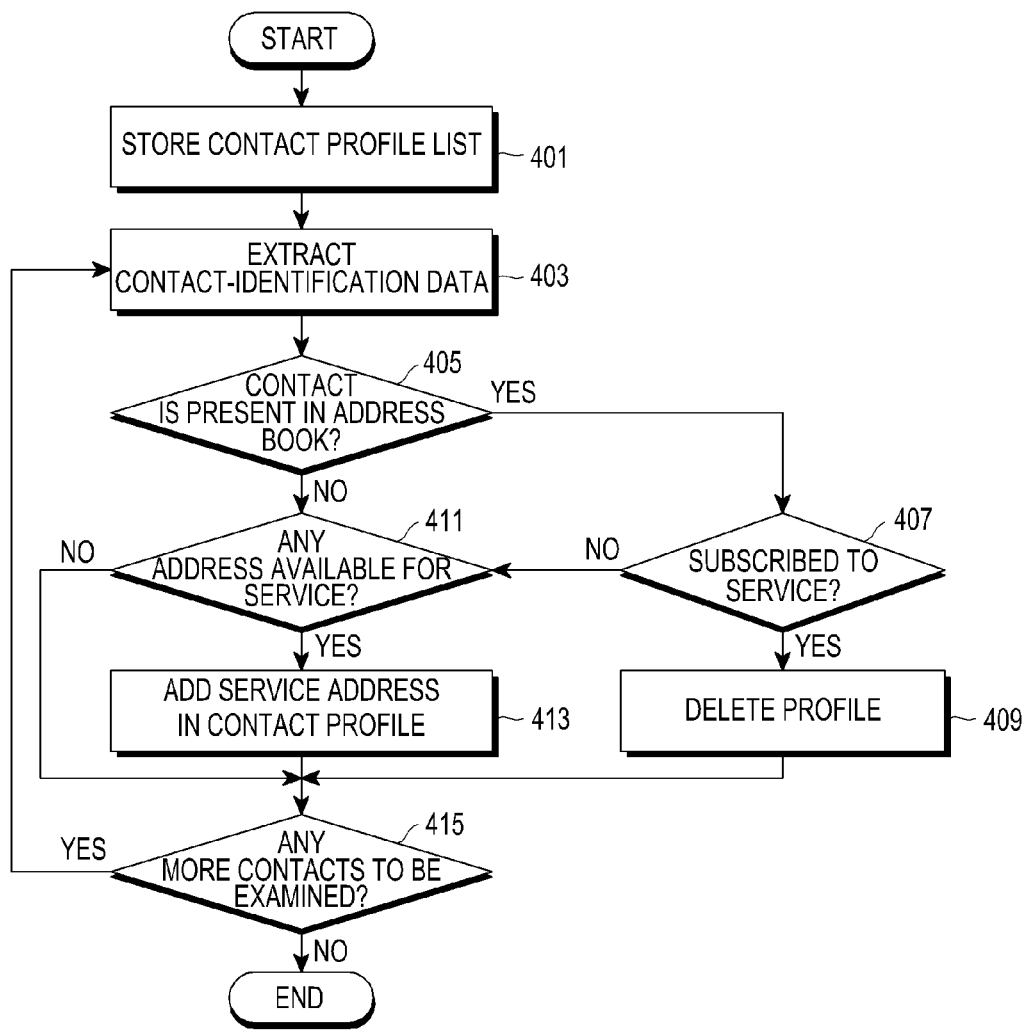
FIG. 4 is a flowchart illustrating an operation of an application server according to an exemplary embodiment of the present invention.

The application server 20 constructed as described above performs contact filtering as illustrated in FIG. 4. The contact filtering is performed under control of the controller 301 in the application server 20.

FIG. 4 is a flowchart illustrating an operation of an application server according to an exemplary embodiment of the present invention.

Referring to FIG. 4, the controller 301 stores a contact profile list received via the I/O interface 303 in the memory 305 in step 401. In step 403, the controller 301 extracts contact-identification data, e.g., a name, an e-mail address, a phone number, and the like, from a profile stored in the memory 305. In step 405, the controller 301 compares the extracted data with its associated data in the address book manager 307 and determines whether the extracted data corresponds to a contact already present in an address book. If it is determined in step 405 that the extracted data corresponds to a contact already present in the address book, the controller 301 determines in step 407 whether the contact has already subscribed to a service M. More specifically, the controller 301 determines whether an indicator indicating subscription of the contact to the service M is present in the address book manager 307. If the contact has already subscribed to the service M, meaning that even the user A knows this fact, the controller 301 deletes the profile for the contact from the memory 305 in step 409, because this contact may no longer undergo filtering.

In contrast, if it is determined in step 405 that the extracted data does not correspond to a contact already present in the address book, or if the contact has not already subscribed to the service M in step 407, the controller 301 determines in step 411 whether there is an address available in the service M. More specifically, the controller 301 determines whether an address available in the service M (hereinafter referred to as a 'service-M address') is present in the address book manager 307 in association with the contact. Therefore, if the extracted data does not correspond to a contact already present in the address book manager 307 or there is no service-M address, e.g., SIP URI, in the address book manager 307, the controller 301 accesses the mapping table manager 309 and determines the presence/absence of a service-M address matched to the contact's e-mail address or phone number extracted in step 403. For example, in a case of an RCS service, although a SIP URI address is available, because the SIP URI address is used by several services, even though the SIP URI address is present, it is not a requirement that the contact subscribes to the RCS service.

Therefore, the presence/absence of a service-M address may be determined in the following exemplary method, and the method is optionally used depending on the situation. In this exemplary method, although no matched contact's service-M address is present in the mapping table manager 309, if the service-M address is likely known by a server in the other network because the other party's client corresponding to the contact is a subscriber to the other network, then the controller 301 may deliver a profile of the contact to the other network's server through the I/O interface 303, and request a matched service-M address. If a response is received from the other network's server through the I/O interface 303 and the received response includes a matched service-M address, the controller 301 adds the service-M address in the mapping table manager 309 together with the contact's e-mail address and phone number.

If it is determined by the above method that the contact's service-M address is present, the controller 301 adds the service-M address in the contact profile in step 413, because the other party's client corresponding to the contact will likely subscribe to the service M. On the other hand, if the contact's service-M address is not present or cannot be known, the controller 301 determines in step 415 whether there are more contacts to be examined. If so, the controller 301 returns to step 403 and repeats the above process, and if not so, the controller 301 ends the contact filtering.

Prior to a description of an operation of an application client A performing a process of determining whether the contact has subscribed to the service and informing the user of the determination results, an internal structure of the application client A will be described with reference to FIG. 5.

Figure 5:
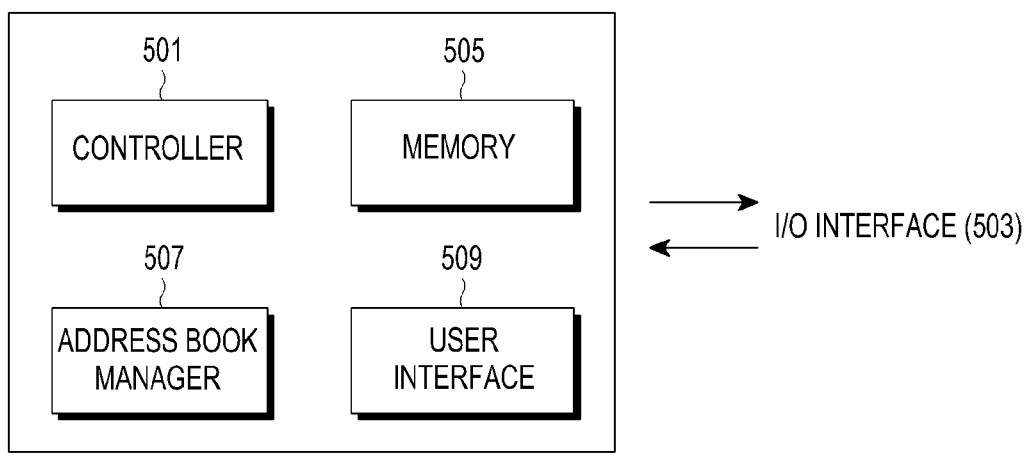
FIG. 5 is a block diagram illustrating a structure of an application client according to an exemplary embodiment of the present invention.

FIG. 5 is a block diagram illustrating a structure of an application client according to an exemplary embodiment of the present invention.

Referring to FIG. 5, a controller 501, a component controlling the overall operation of the application client A 10, informs when and what it should perform, in cooperation with other internal components. In I/O interface 503 is used to exchange information with other system entities. A memory 505 is a storage unit in which processing data is temporarily stored when the application client A 10 performs its operations. An address book manager 507, which is a storage unit containing a user's existing contact information, is synchronized with the address book manager 307 used in the application server 20. A user interface 509 is used to show all information about the user, or is used by the user to input information.

Figure 6:
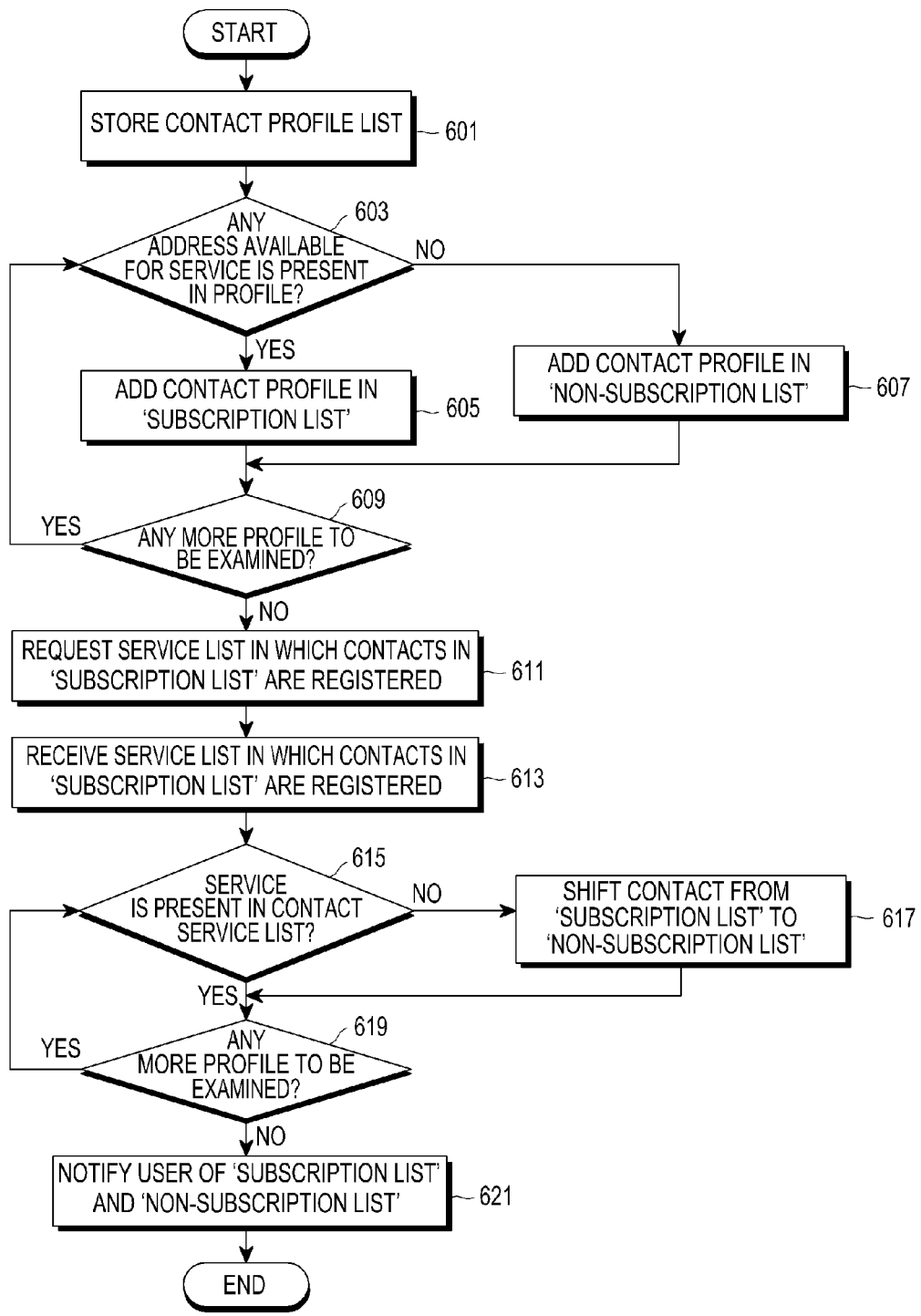
FIG. 6 is a flowchart illustrating an operation of an application client according to an exemplary embodiment of the present invention.

The application client A 10 constructed as described above performs a process of determining whether a contact has subscribed to a specific service and informing its user of the determination results, as in FIG. 6. This operation is performed under control of the controller 501 of the application client A 10.

FIG. 6 is a flowchart illustrating an operation of an application client according to an exemplary embodiment of the present invention.

Referring to FIG. 6, the controller 501 stores a filtered-contact profile list received through the I/O interface 503 in the memory 505 in step 601. Thereafter, the controller 501 determines in step 603 whether a service-M address is present in the contact profile stored in the memory 505. If the service-M address is present, the controller 501 adds the contact profile in a 'subscription list' and stores it in the memory 505 in step 605, because the contact will likely subscribe to the service M. On the other hand, if the service-M address is not present, it is unlikely that the contact will subscribe to the service M, or cannot be known. Therefore, in step 607, the controller 501 adds the contact profile in a 'non-subscription list', and stores it in the memory 505.

The controller 501 determines in step 609 whether more contact profile to be examined is present in the received list. If more contact profile to be examined is present, the controller 501 returns to step 603 and repeats the above process. However, if more contact profile to be examined is not present, the controller 501 sends contacts in the 'subscription list' stored in the memory 505 to the service registration server 50 through the I/O interface 503, and requests a service list in which contacts in the 'subscription list' are registered, in step 611. The controller 501 receives a service list, which is registered to correspond to each contact in response to the request, from the service registration server 50 through the I/O interface 503 in step 613. For example, the controller 501 receives a list of services to which the other party's clients corresponding to the contacts have registered.

The controller 501 determines in step 615 whether the service M is present in a contact service list. If the service M is not present, the controller 501 moves the contact stored in the memory 505 from the 'subscription list' to the 'non-subscription list' in step 617, because the contact has not subscribed to the service M. The controller 501 determines in step 619 whether more contact profile to be examined is present in the received contact profile list. If more contact profile to be examined is present, the controller 501 returns to step 615 and repeats the above process. On the other hand, if more contact profile is not present, the controller 501 notifies the user A of the contacts in the 'subscription list' and 'non-subscription list' stored in the memory 505 using the user interface 509 in step 621.

In a case of the contacts in the 'subscription list', the application client A 10 notifies the user A of the fact that a relevant contact uses the same service M, and provides a method of adding a contact in the address book manager 507 and a method capable of connecting with the contact through the service M. In a case of the contacts in the 'non-subscription list', the application client A 10 notifies the user A of the fact that a relevant contact is present, and provides a method of adding a contact in the address book manager 507 and a method capable of sending a subscription invite message to the service M, to the contact.

Assuming that the service M, to which a user of the application client A 10 has subscribed, is an RCS service, the RCS service provides the service by means of a combination of a plurality of enablers and profiling. In exemplary embodiments of the present invention, the number of targets, subscription/non-subscription of which to a specific service can be determined, can be extended by interworking the RCS service with an SNS service. The RCS service may be provided based on OMA CAB and OMA Presence, which are examples of enablers providing an address book integration function.

Accordingly, the application client A 10 in FIG. 2 may operate as a CAB client to receive a new contact, and may also operate as a Presence client to receive service subscription/non-subscription of a client corresponding to the received new contact. Therefore, the system providing contacts through interworking with an SNS service may be implemented based on OMA CAB and OMA Presence enablers.

Figure 7:
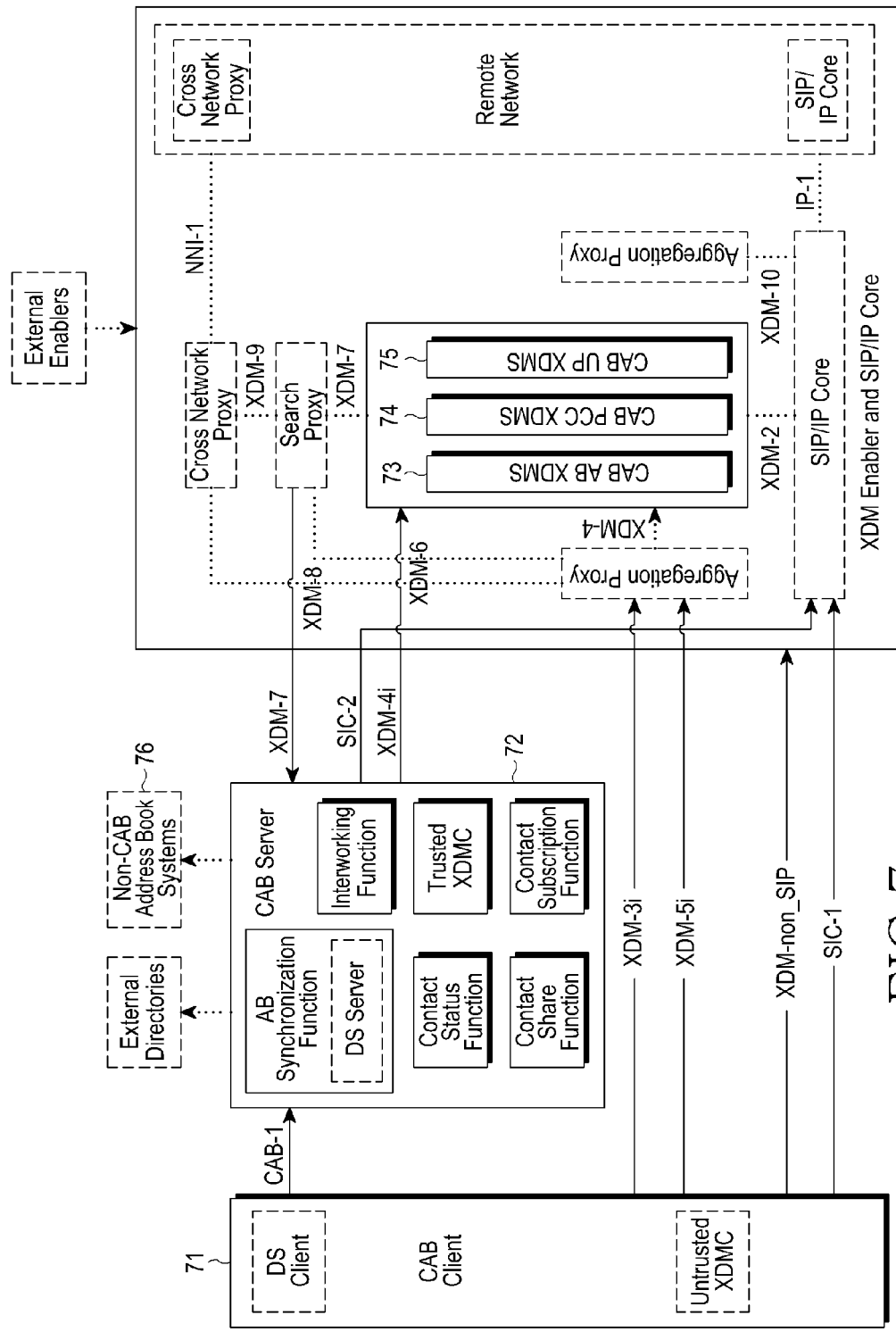
FIG. 7 is a diagram illustrating an architecture for a Converged Address Book (CAB) service according to an exemplary embodiment of the present invention.

Reference will be made to FIG. 7 to describe an architecture of the CAB system used in exemplary embodiments of the present invention.

FIG. 7 is a diagram illustrating an architecture for a CAB service according to an exemplary embodiment of the present invention.

Referring to FIG. 7, a CAB Client 71 is an application program for managing and controlling an address book in a user terminal. A CAB Server 72 is a major network entity for handling user's various requirements received from the CAB Client 71. A CAB Address Book (AB) XML Document Management Server (XDMS) 73 is a server for storing and managing address books of users. A CAB Personal Contact Card (PCC) XDMS 74 is a server for storing and managing profiles of users. A CAB User Preferences (UP) XDMS 75 is a server for storing and managing preferences and specific requirements of users. A Non-CAB Address Book System 76 includes an address book system used in a CAB service, and all other address book systems. For example, vCard and the like correspond thereto. It can be assumed that the SNS providers 40 and 41 described in FIG. 2 are also included in the Non-CAB Address Book System 76.

The interfaces and protocols/technologies used in exemplary embodiments of the present invention are described below.

A CAB-1 interface is used for synchronization between an address book in the CAB Client 71 and an address book stored in the CAB AB XDMS 73 by way of the CAB Server 72. The CAB-1 interface is also used when the CAB Server 72 notifies the CAB Client 71 of a difference between the two address books. SyncML is used as its protocol/technology.

A Service Interface Card-1 (SIC-1) is used to inform the CAB Client 71 of changes, every time data stored in the CAB PCC XDMS 74 and the CAB UP XDMS 75 are changed. For reference, the CAB-1 interface is used to inform the CAB Client 71 of a change in data stored in the CAB AB XDMS 73. SIP-Specific Event Notification is used as its protocol/technology.

A SIC-2 interface is used to inform the CAB Server 72 of changes, every time data stored in the CAB AB XDMS 73, the CAB PCC XDMS 74, and the CAB UP XDMS 75 are changed. SIP-Specific Event Notification is used as its protocol/technology.

An XDM-3i interface is used when the CAB Client 71 manages data stored in the CAB PCC XDMS 74 and the CAB UP XDMS 75. XML Configuration Access Protocol/HyperText Transfer Protocol (XCAP/HyperText Transfer Protocol (HTTP)) is used as its protocol/technology.

An XDM-4i interface is used when the CAB Server 72 manages data stored in the CAB AB XDMS 73, the CAB PCC XDMS 74, and the CAB UP XDMS 75. XCAP/HTTP is used as its protocol/technology.

Figure 8:
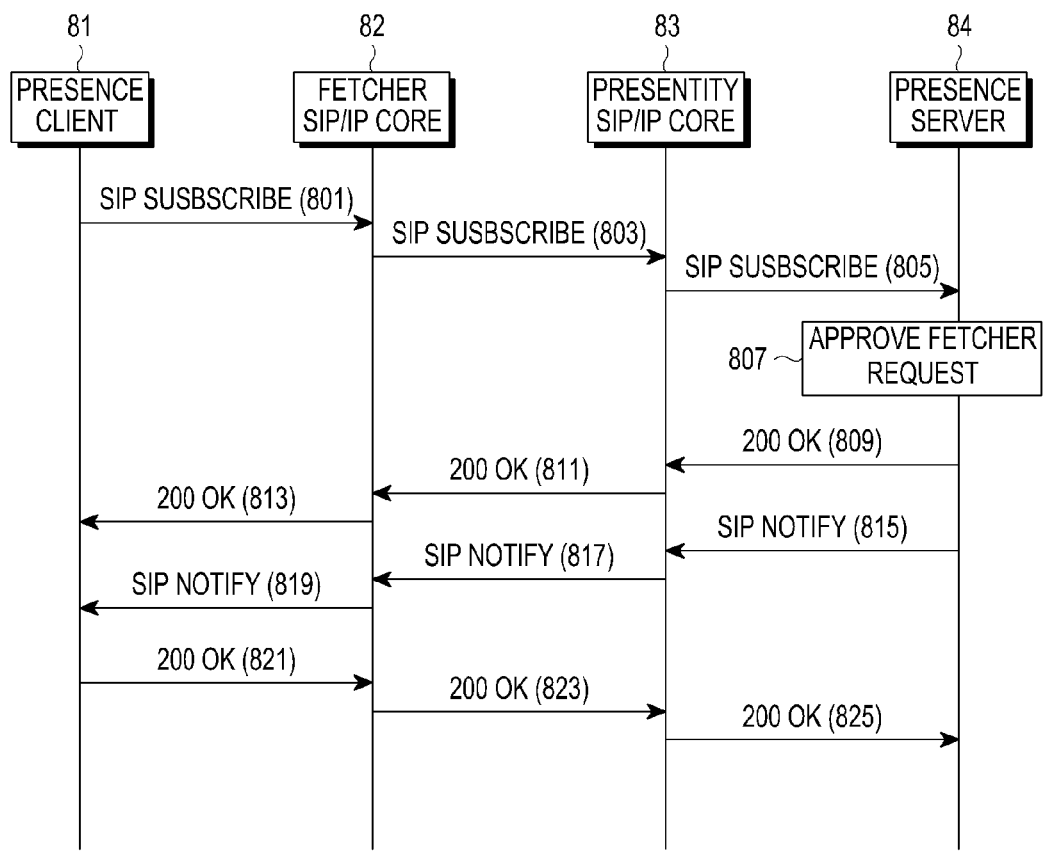
FIG. 8 is a flow diagram illustrating an operation in a Presence enabler according to an exemplary embodiment of the present invention.

An operation flow in a Presence enabler used in an exemplary embodiment of the present invention is illustrated in FIG. 8. An OMA Presence enabler performs the operation of FIG. 8 when a user wants to determine the service used by the other user. The operation flow is carried out using the SIP-Specific Event Notification protocol.

FIG. 8 is a flow diagram illustrating an operation in a Presence enabler according to an exemplary embodiment of the present invention.

Referring to FIG. 8, a Presence client 81, a fetcher, sends a SIP SUBSCRIBE to receive Presence information that the other user has registered in a Presence server 84, in step 801. To receive the Presence information only once, an "Expires" header is set to '0' in the SIP SUBSCRIBE. On the other hand, in order to periodically receive changes in the Presence information, the "Expires" header may be set to a higher value. The SIP SUBSCRIBE is forwarded to the Presence server 84 through a Fetcher SIP/IP Core 82 corresponding to a SIP-based sub-transmission network and a Presentity SIP/IP Core 83 in the side of the Presence server 84 in steps 803 and 805.

In step 807, the Presence server 84 performs authorization check to determine whether the Presence client 81 is approved to receive the requested information. Upon approval of the request, the Presence server 84 sends a 200 OK to the Presence client 81 via the SIP/IP Cores 82 and 83 in steps 809 through 813. Thereafter, in steps 815 through 819, the Presence server 84 delivers the requested information to the Presence client 81 via the SIP/IP Cores 82 and 83 using a SIP NOTIFY. In response to the SIP NOTIFY, the Presence client 81 sends an Acknowledgement (ACK) of the Presence information to the Presence server 84 through the SIP/IP Cores 82 and 83 using a 200 OK in steps 821 through 825.

The operation flow of FIG. 2 may be reconstructed based on the foregoing description of FIGS. 7 and 8, and will be described below. A configuration of the system, which is reconstructed based on FIGS. 7 and 8, and interworks with an RCS service and an SNS service, may be implemented as in FIGS. 9A through 13B. Here, FIGS. 9B, 10B, 11B, 12B, and 13B are diagrams succeeding FIGS. 9A, 10A, 11A, 12A, and 13A, respectively.

Figure 9A:
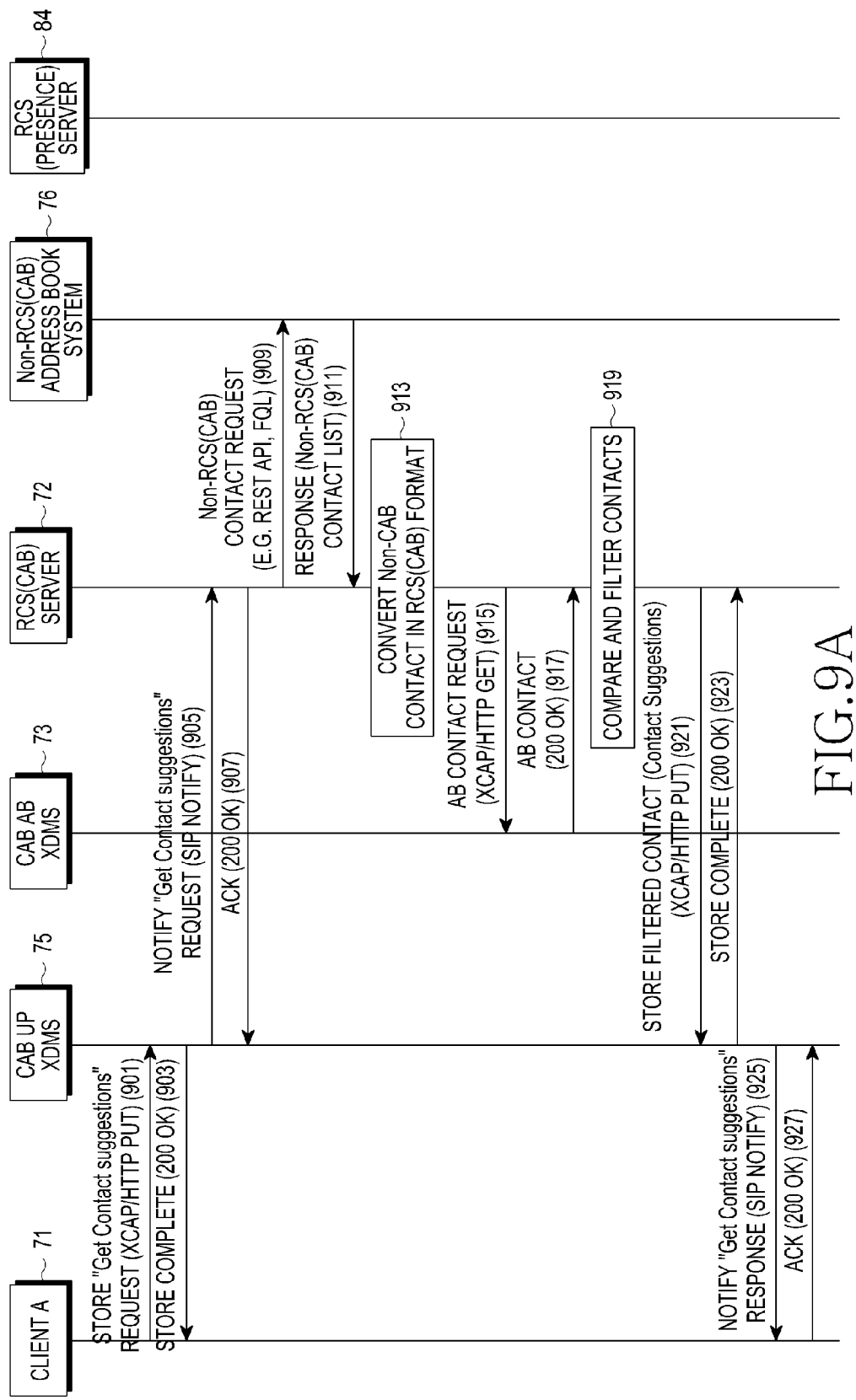
FIGS. 9A and 9B are flow diagrams illustrating a process of providing contacts according to a first exemplary embodiment of the present invention.
Figure 9B:
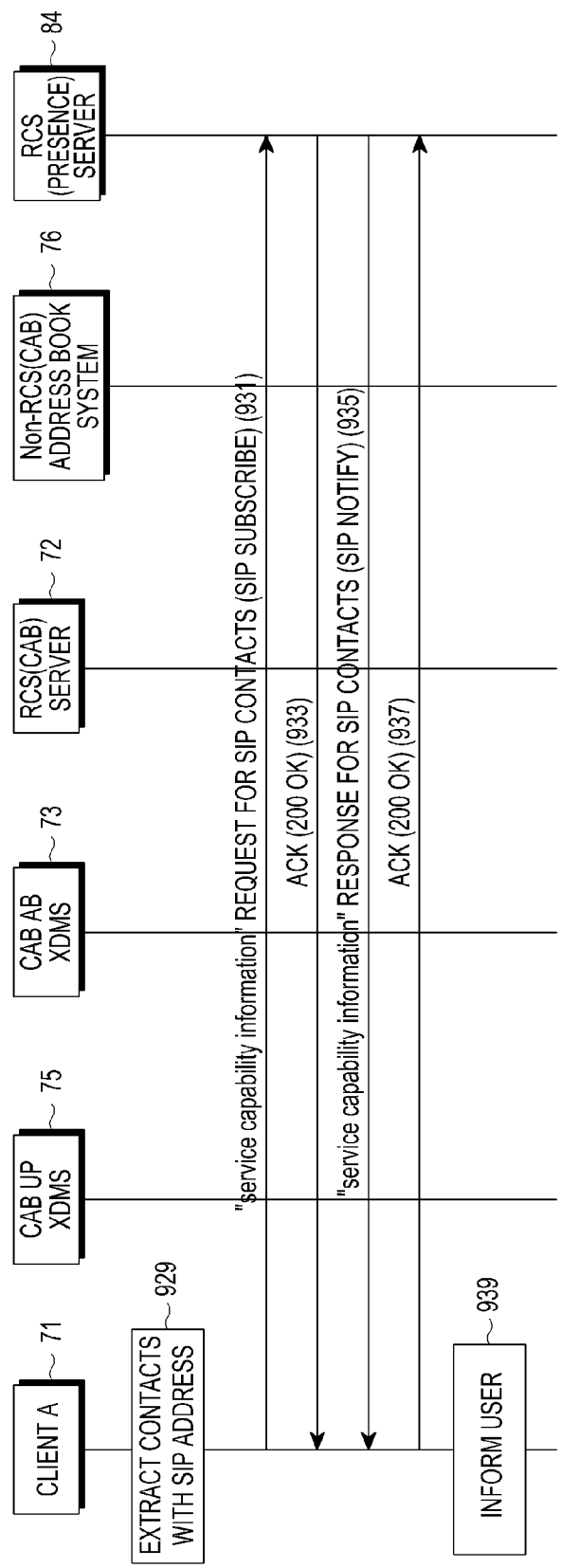

FIGS. 9A and 9B are flow diagrams illustrating a process of providing contacts according to a first exemplary embodiment of the present invention.

Referring to FIGS. 9A and 9B, the application server 20 and the SNS interworking server 30 in FIG. 2 are integrated. For convenience of description, entities for routing and other purposes, for example, SIP/IP Cores, IMS, and Aggregation Proxy, are omitted herein, but it can be assumed that the process undergoes these entities, if needed. In the following drawings, since the RCS service of FIG. 2 is reconstructed based on the CAB service, the RCS-related terms may be replaced with the terms used in CAB, and for convenience of description, the RCS terms and the CAB terms will be used in a mixed way. Similarly, the SNS terms in FIG. 2 may also be used together with their associated non-RCS terms.

Referring to FIG. 9A, when a user A accesses an RCS service, the RCS (CAB) client A 71 makes a request to store detailed information about a request in a "CAB Feature Handler" document managed by the CAB UP XDMS 75, to receive a new contact suggestion list. To this end, a "Get Contact suggestions" request is sent to the CAB UP XDMS 75 among the CAB XDMSs in the form of XCAP/HTTP PUT, in step 901. A description of the "CAB Feature Handler" document will be provided below.

In step 903, the CAB UP XDMS 75 stores requirements in the "CAB Feature Handler" document in its management, and sends a 200 OK, or a store complete response, to the RCS (CAB) client A 71. In step 905, the CAB UP XDMS 75 notifies the RCS (CAB) server 72 of the requirements and associated information of the RCS (CAB) client A 71, which are stored in the "CAB Feature Handler" document. For this notification, a SIP NOTIFY message is used. In step 907, upon receiving the notification, the RCS (CAB) server 72 sends a 200 OK, or an ACK message, to the CAB UP XDMS 75. In step 909, the RCS (CAB) server 72 determines the requirements, converts them in a format appropriate for the Non-RCS (CAB) address book system 76, and sends a request for a Non-RCS (CAB) contact list to the Non-RCS (CAB) address book system 76. The Non-RCS (CAB) address book system 76 corresponds to an SNS provider. Although a Non-RCS (CAB) address book system corresponding to one SNS provider is illustrated in FIGS. 9A and 9B, if there are a plurality of SNS providers, the RCS (CAB) server 72 may receive contact lists from the plurality of SNS providers and combines them.

In step 911, the Non-RCS (CAB) address book system 76 sends the requested Non-RCS (CAB) contact list to the RCS (CAB) server 72. To exactly receive the list, steps 909 and 911 may be repeated. In step 913, the RCS (CAB) server 72 converts the received Non-CAB contact list in an RCS (CAB) format. In step 915, the RCS (CAB) server 72 sends a request for the existing address book of the user A, stored in the network, to the CAB AB XDMS 73. For this request, an XCAP/HTTP GET may be used. In response, the CAB AB XDMS 73 sends a 200 OK including the requested address book of the user A, to the RCS (CAB) server 72 in step 917. The RCS (CAB) server 72 performs functions of the application server 20 and the SNS interworking server 30 in FIG. 2.

In step 919, the RCS (CAB) server 72 filters contacts by comparing the existing contacts of the user A with the new contact profiles received from the Non-RCS (CAB) address book system 76. This contact filtering operation is performed as described in FIG. 4. The filtered contacts are stored in the CAB UP XDMS 75 in step 921. To request the storage, an XCAP/HTTP PUT is used. In step 923, the CAB UP XDMS 75 stores the received contact profiles and sends a 200 OK to the RCS (CAB) server 72 as an ACK.

In step 925, the CAB UP XDMS 75 notifies the RCS (CAB) client A 71 of the fact that new contact profiles are stored therein, and sends the profiles to the RCS (CAB) client A 71 using a SIP NOTIFY message. The received profile is a response to the request that the RCS (CAB) client A 71 sent in step 901. In step 927, the RCS (CAB) client A 71 sends an ACK message for the received SIP NOTIFY to the CAB UP XDMS 75.

In this manner, the RCS (CAB) client A 71 may extend the number of targets, subscription/non-subscription of which to a specific service can be determined, through interworking with the Non-RCS provider, i.e., an SNS provider. To this end, in step 929, the RCS (CAB) client A 71 extracts a contact having a SIP address from the received profile. More specifically, according to the description of FIG. 6, the RCS (CAB) client A 71 determines the presence/absence of an address available for the RCS service, i.e., a SIP URI, among the received contact profiles, and extracts the contacts. In step 931, based on the SIP contact addresses, the RCS (CAB) client A 71 sends the RCS (Presence) server 84 a request for "service capability information" of each SIP contact, which indicates a list of services available on the RCS (Presence) client A 71. For this request, a SIP SUBSCRIBE message is used. The RCS (CAB) client A 71 and the RCS (Presence) client A 71 are application programs, which correspond to the application client A 10 in FIG. 2 and are installed in the same user terminal. However, when requesting a contact, the client A 71 is called the RCS (CAB) client A 71, since it operates as an RCS (CAB) client. When requesting to determine subscription/non-subscription to a service, the client A 71 is called the RCS (Presence) client A 71, since it operates as an RCS (Presence) client.

If the RCS (Presence) server 84 accepts the request after performing authorization check to determine whether the RCS (Presence) client A 71 is allowed to receive the requested information, the RCS (Presence) server 84 sends a 200 OK or an accept message to the RCS (Presence) client A 71 in step 933. In step 935, the RCS (Presence) server 84 delivers the requested "service capability information" of contacts to the RCS (Presence) client A 71 using a SIP NOTIFY message. Upon receiving this message, the RCS (Presence) client A 71 sends a 200 OK or an ACK of the "service capability information" to the RCS (Presence) server 84 in step 937.

Thereafter, in step 939, the RCS (CAB) client A 71 determines whether the "service capability information" of each contact is for an RCS user and informs its user of the determination results by means of the RCS (Presence) client A 71 according to steps 615 through 621 in FIG. 6.

Figure 10A:
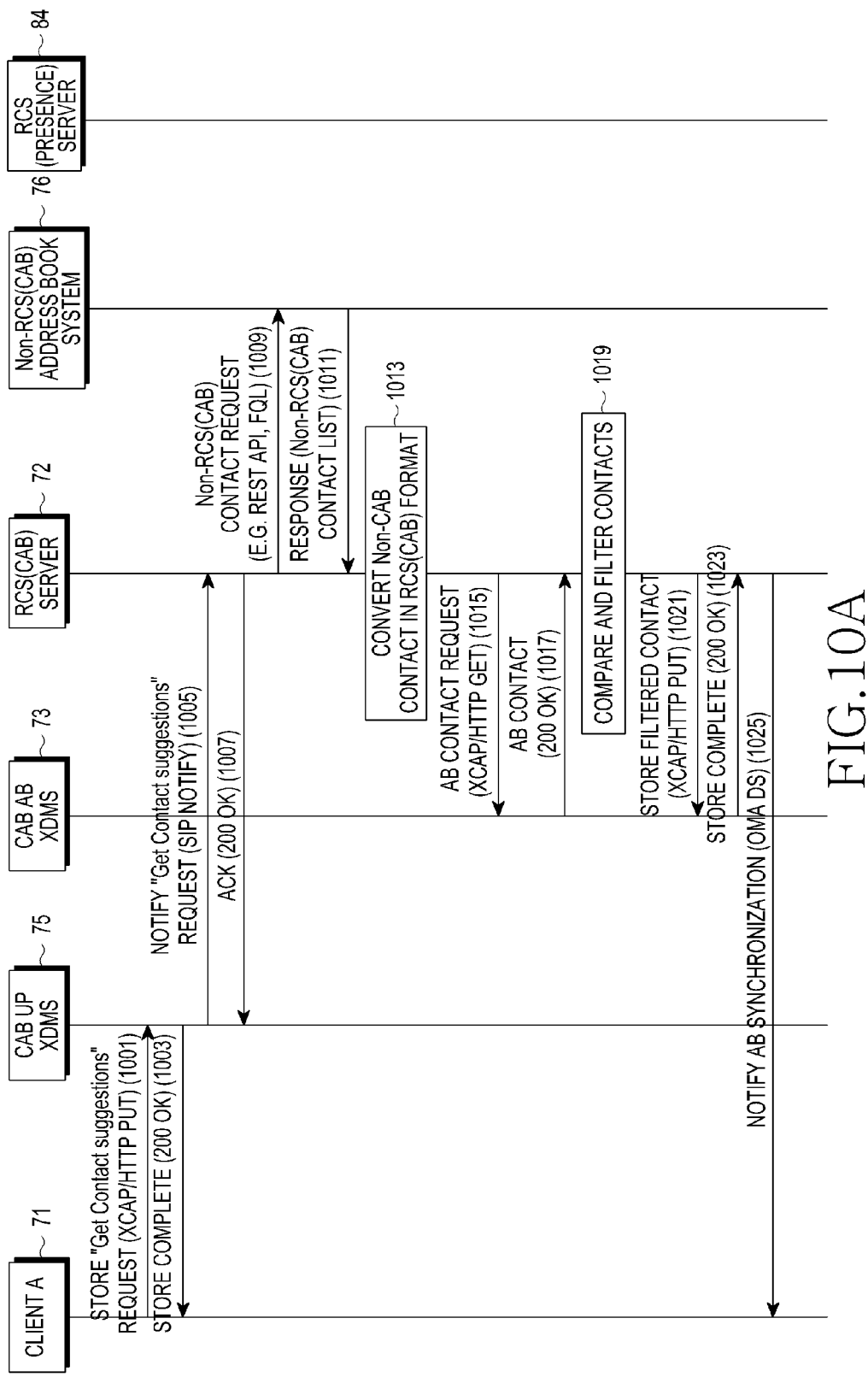
FIGS. 10A and 10B are flow diagrams illustrating a process of providing contacts according to a second exemplary embodiment of the present invention.
Figure 10B:
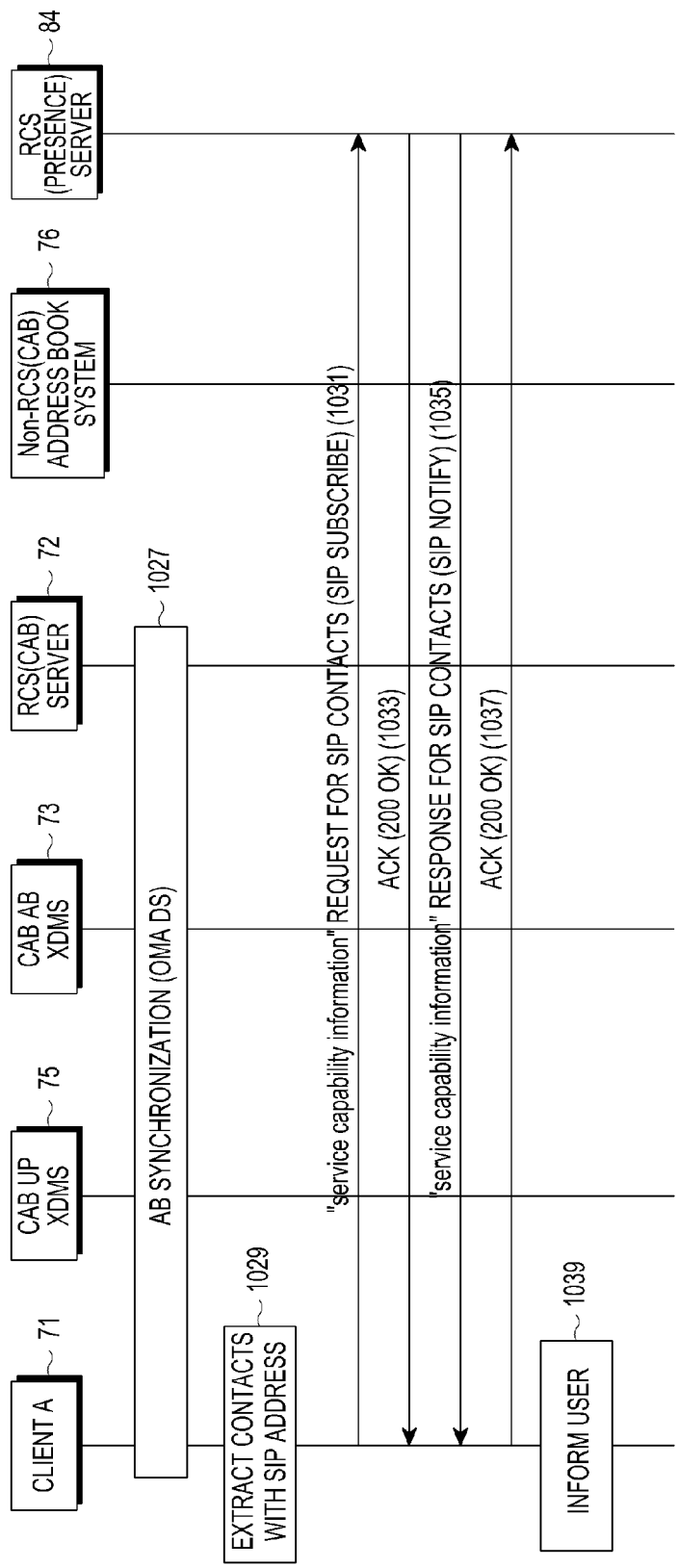

As described above, in the first exemplary embodiment of the present invention, the RCS (CAB) server 72 performs both the filtering function and the interworking function, and the filtered contacts are stored independently in the "CAB Feature Handler" document managed in the CAB UP XDMS 75. On the other hand, however, the filtered contacts may be stored not in the "CAB Feature Handler" document, but in an address book of the RCS (CAB) client A 71. A configuration according to a second exemplary embodiment of the present invention is as illustrated in FIGS. 10A and 10B.

Prior to a description of the second exemplary embodiment of the present invention, elements in the "CAB Feature Handler" document will be described.

In exemplary embodiments of the present invention, a <contact_suggestions> element is defined. The <contact_suggestions> element is an element that the RCS (CAB) client A 71 includes in the "CAB Feature Handler" document when it desires to receive a new contact suggestion list. Low-level elements of this element may include <non-CAB source>, <credentials>, <criteria>, <scheduled-interval>, <max-suggestions>, <id>, <code>, <phrase>, <contact_suggestions_response>, and the like.

Low-level element <non-CAB source> is used for recording an arbitrary agency from which the RCS (CAB) client A 71 desires to receive a new contact suggestion. For example, a domain name of the agency is recorded in this element. In the absence of this element, the agency is determined depending on the service provider policy.

Low-level element <credentials> represents the information needed for authentication during access to the agency. Low-level elements of <credentials> include <username> in which login information is recorded, and <password> in which a password is recorded.

Low-level element <criteria> may be replaced with <preferences> or <keywords>, and is used to set a criteria based on which a new contact suggestion is to be selected. Low-level elements of this element may include <friend-of-a-friend>, <same-school>, <same-work>, <same-hobby>, and the like.

First, <friend-of-a-friend>, also called <mutual-friend>, is set to '1' when the RCS (CAB) client A 71 desires to receive contacts of the contacts registered in a user address book in the agency, for example, when the RCS (CAB) client A 71 desires to receive contacts of friends of the user's friend.

In <same-school> is recorded a name of a specific school when the RCS (CAB) client A 71 desires to receive a suggestion of contacts who went to the same school.

In <same-work> is recorded a name of a specific company or a type of a specific work when the RCS (CAB) client A 71 desires to receive a suggestion of contacts having the same work.

In <same-hobby> is recorded a specific hobby when the RCS (CAB) client A 71 desires to receive a suggestion of contacts having the same hobby.

The above low-level elements are mere examples, and desired keywords may be directly input in the <criteria>(or <preferences>, and <keywords>) element. Even the <criteria>, if not recorded, may be determined according to the user profile and service provider policy as the RCS (CAB) server 72 accesses the user profile or the CAB PCC XDMS 74.

In <scheduled-interval> is recorded a suggested time interval when the RCS (CAB) client A 71 desires to receive a contact suggestion not only once, but by periods.

In <max-suggestions> is set the maximum number of contacts for which the RCS (CAB) client A 71 desires to receive a suggestion.

<id> is an ID for identifying each request.

The above-described <contact_suggestions> element is a low-level element of a cab_feature element, which may include a <response> element. The <response> element is an element that the RCS (CAB) server 72 fills with data when it responds to a request made by the RCS (CAB) client A 71 as in step 921. Low-level elements of the <response> element include the following elements:

In <code> is recorded, as a status code for the response, a status code indicating whether the response is successful or failed, <phrase> is a high-level phrase for the response, and In <contact_suggestions response> is a recorded detailed response to the above-described <contact_suggestions> request. This element carries new contact suggestion information, and a detailed information structure for each contact follows the structure defined by OMA CAB.

Although it is assumed in the first exemplary embodiment of the present invention that the <contact_suggestions_response> element is put in the same document as that of the new contact suggestion request information, this element may be recorded in other documents.

In the second exemplary embodiment of the present invention, filtered contacts are stored in the address book of the RCS (CAB) client A 71. For a description thereof, reference will be made to FIGS. 10A and 10B.

FIGS. 10A and 10B are flow diagrams illustrating a process of providing contacts according to a second exemplary embodiment of the present invention.

Referring to FIGS. 10A and 10B, steps 1001 through 1019 are substantially equal in operation to steps 901 through 919 in FIG. 9A, except that in the second exemplary embodiment of the present invention, filtered contacts are stored in the CAB AB XDMS 73. Accordingly, in step 1021, the RCS (CAB) server 72 requests the CAB AB XDMS 73 to store the filtered contacts. For this request, a XCAP/HTTP PUT is used. The filtered contacts may be directly stored in the user address book, or may be stored in another separate document.

In step 1023, the CAB AB XDMS 73 stores the received contact profiles and sends a 200 OK or an ACK to the RCS (CAB) server 72. In step 1025, the RCS (CAB) server 72 notifies the RCS (CAB) client A 71 of the change in the address book. For this notification, OMA Data Synchronization (OMA DS) is used. In step 1027 of FIG. 10B, the RCS (CAB) client A 71 performs address book synchronization with the RCS (CAB) server 72, and they receive in common the new contact suggestions through the synchronization. Steps 1029 through 1039 in FIG. 10B are substantially equal in operation to steps 929 through 939 in FIG. 9B. However, when directly stored in the address book, the added contact suggestions may be deleted from the address book depending on the use/nonuse of the RCS service by the contacts, and on the user's disposition or choice.

Figure 11A:
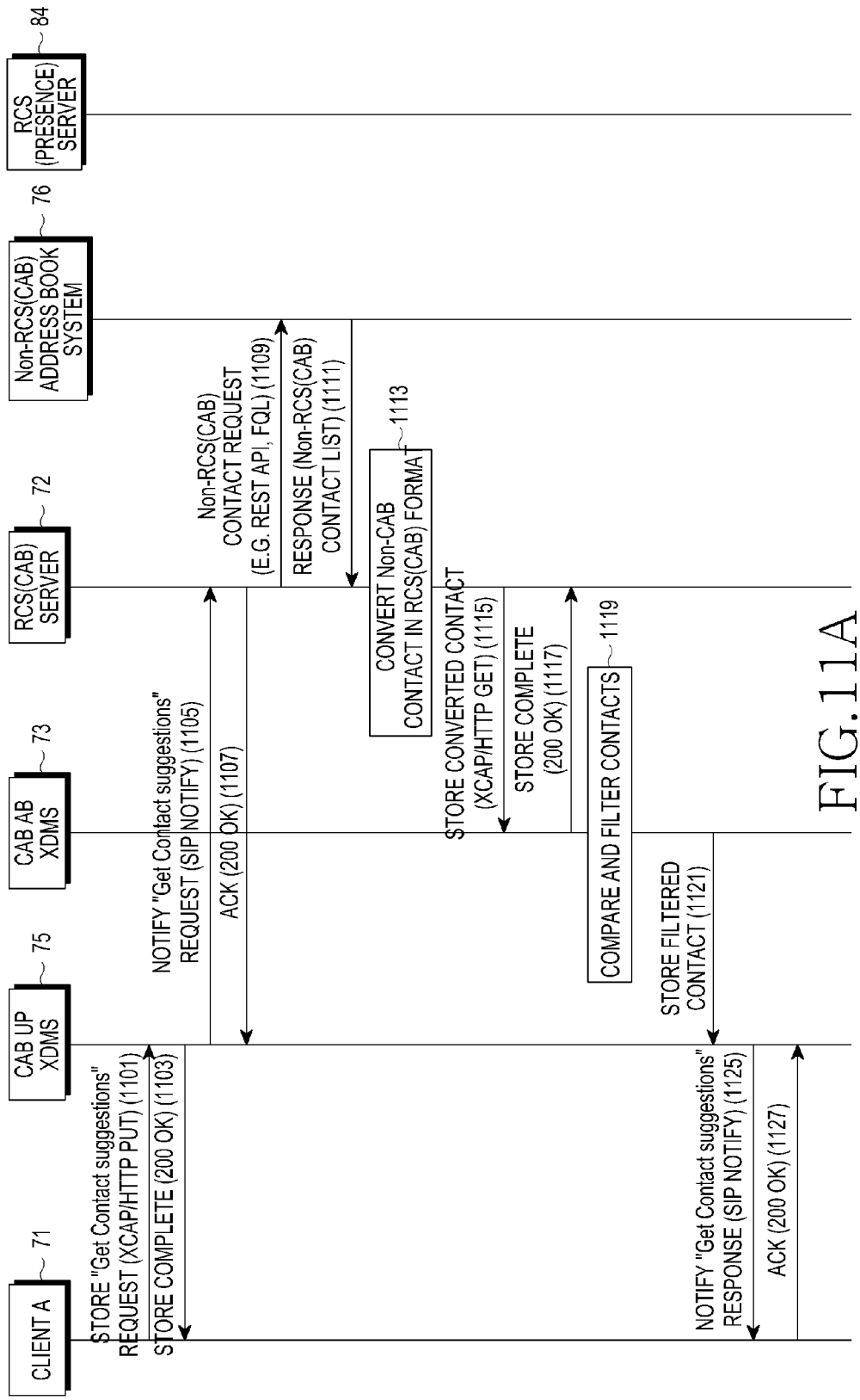
FIGS. 11A and 11B are flow diagrams illustrating a process of providing contacts according to a third exemplary embodiment of the present invention.
Figure 11B:
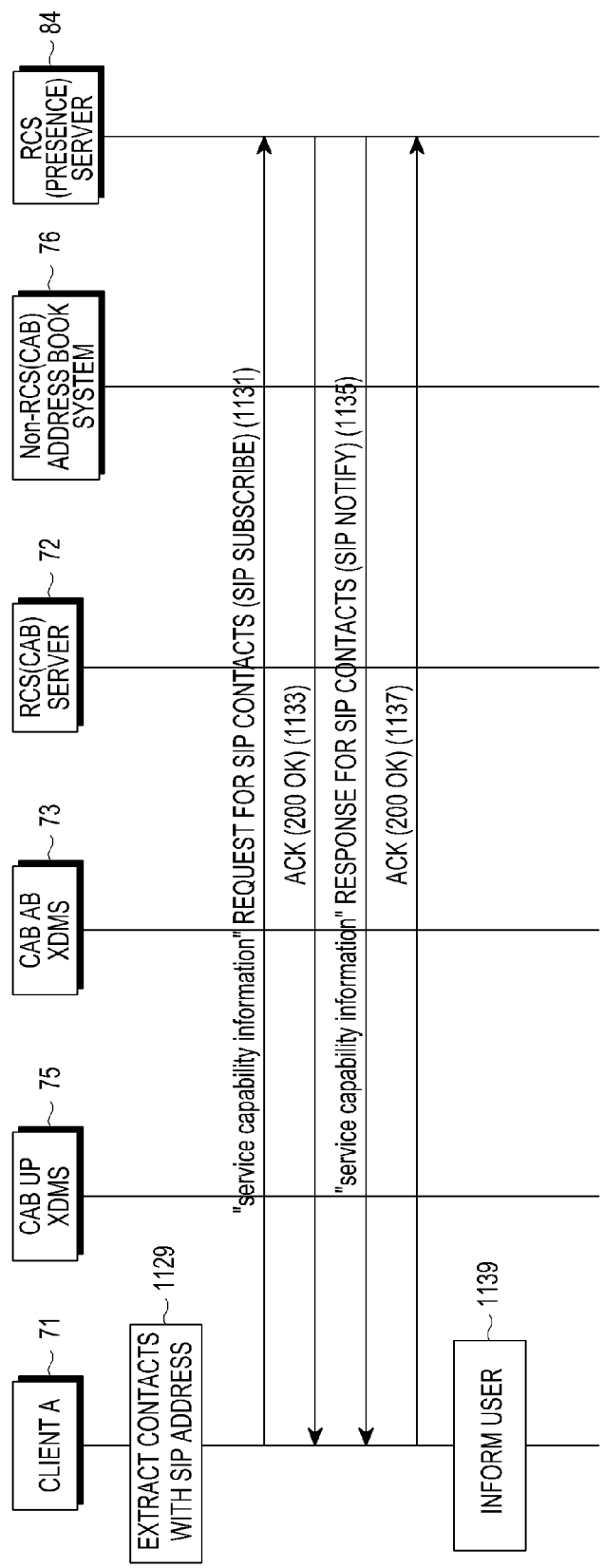

In a third exemplary embodiment of the present invention, the contact filtering step and the step of storing the filtered contact list in the CAB UP XDMS 75 in the second exemplary embodiment of the present invention are performed not by the RCS (CAB) server 72, but by the CAB AB XDMS 73. Reference will be made to FIGS. 11A and 11B to describe the third exemplary embodiment of the present invention.

FIGS. 11A and 11B are flow diagrams illustrating a process of providing contacts according to a third exemplary embodiment of the present invention.

Referring to FIGS. 11A and 11B, steps 1101 through 1113 in FIG. 11A are substantially equal in operation to steps 901 through 913 in FIG. 9A, except that the CAB AB XDMS 73 performs an operation of filtering contacts and storing them in the CAB UP XDMS 75. Accordingly, in step 1115, the RCS (CAB) server 72 requests the CAB AB XDMS 73 to store the changed contacts, using an XCAP/HTTP PUT. In step 1117, the CAB AB XDMS 73 stores the received contact profiles and sends a 200 OK to the RCS (CAB) server 72 as an ACK. In step 1119, the CAB AB XDMS 73 filters contacts by comparing the existing contacts of the user A with (changed) new contact profiles received from the RCS (CAB) server 72 according to the operation described in FIG. 4.

In step 1121, the CAB AB XDMS 73 stores the filtered contacts in the CAB UP XDMS 75. Because the operation of storing the filtered contacts is an operation carried out between internal CAB XDMS entities, a separate protocol or an ACK message is not used. Other steps 1125 through 1139 in FIGS. 11A and 11B are substantially equal in operation to steps 925 through 939 in FIGS. 9A and 9B.

Figure 12A:
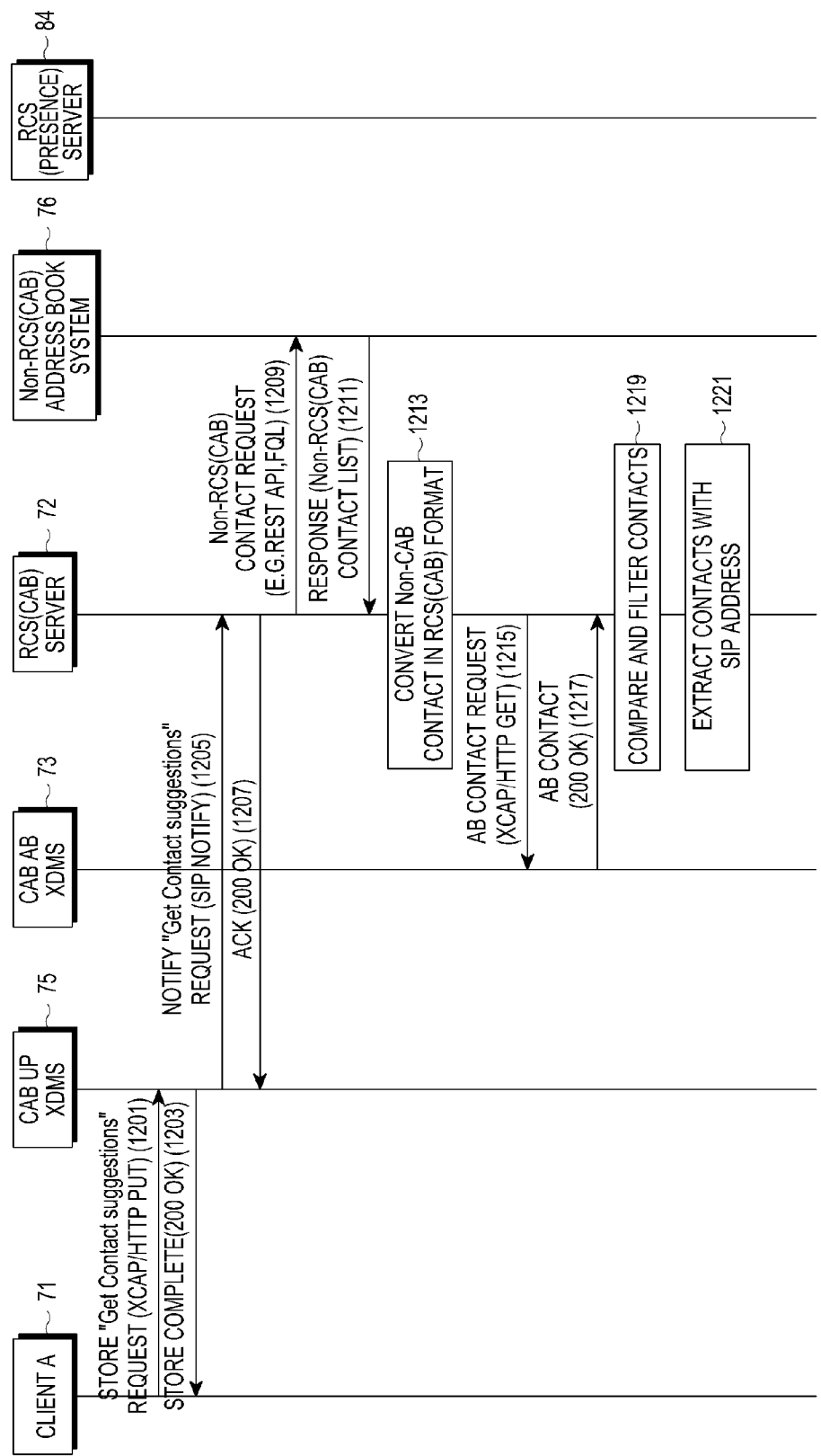
FIGS. 12A and 12B are flow diagrams illustrating a process of providing contacts according to a fourth exemplary embodiment of the present invention.
Figure 12B:
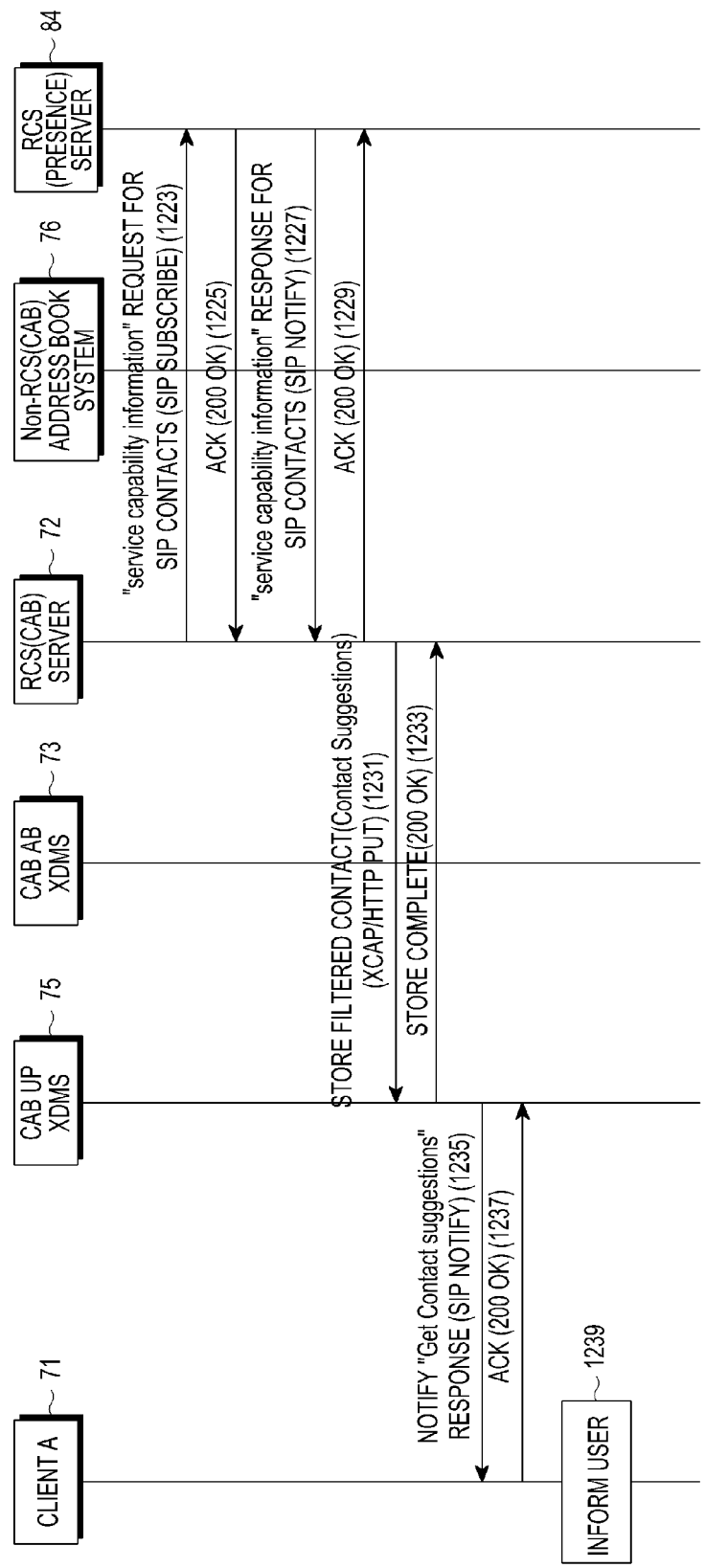

In a fourth exemplary embodiment of the present invention, the contact filtering step and the process of extracting SIP contacts and requesting "service capability information" in the first exemplary embodiment of the present invention are performed together by the RCS (CAB) server 72 in advance. Reference will be made to FIGS. 12A and 12B to describe the fourth exemplary embodiment of the present invention.

FIGS. 12A and 12B are flow diagrams illustrating a process of providing contacts according to a fourth exemplary embodiment of the present invention.

Referring to FIGS. 12A and 12B, steps 1201 through 1219 in FIG. 12A are substantially equal in operation to steps 901 through 919 in FIG. 9A. Although steps 1221 through 1229 in FIGS. 12A and 12B are substantially equal in operation to steps 929 through 937 in FIG. 9B, this operation is performed not by the RCS (Presence) client 81, but by the RCS (CAB) server 72. Therefore, it is assumed that a Presence function serving as the Presence client 81 is included in the RCS (CAB) server 72.

In addition, steps 1231 through 1237 in FIG. 12B are substantially equal in operation to steps 921 through 927 in FIG. 9A. However, a contact suggestion profile, stored in step 1231, includes an indicator indicating whether each contact has subscribed to the RCS (CAB) service, according to the operation results of steps 1231 through 1237. In step 1239, the RCS (CAB) client A 71 provides the received contact information to its user without the need for analysis.

Figure 13A:
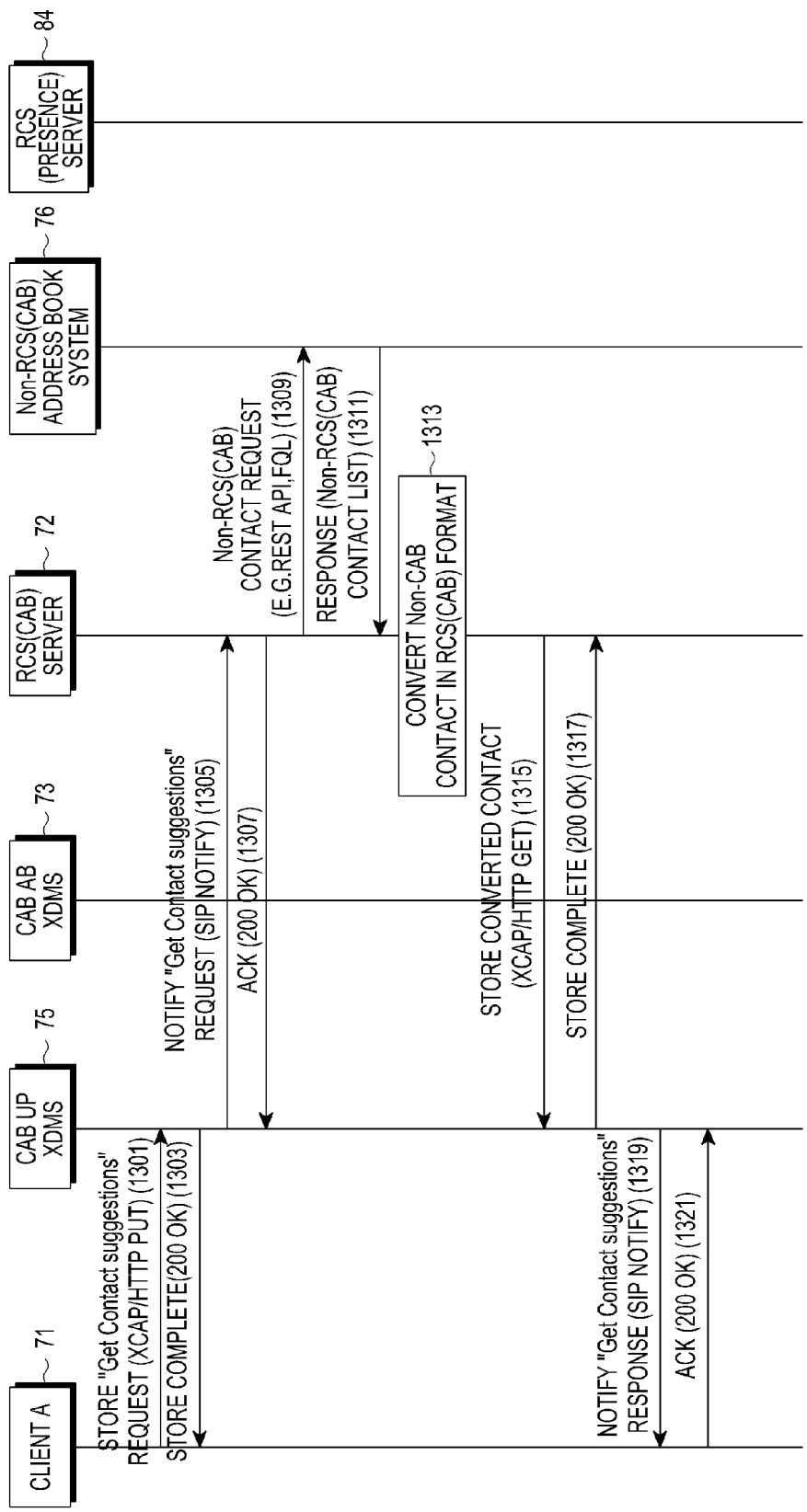
FIGS. 13A and 13B are flow diagrams illustrating a process of providing contacts according to a fifth exemplary embodiment of the present invention.
Figure 13B:
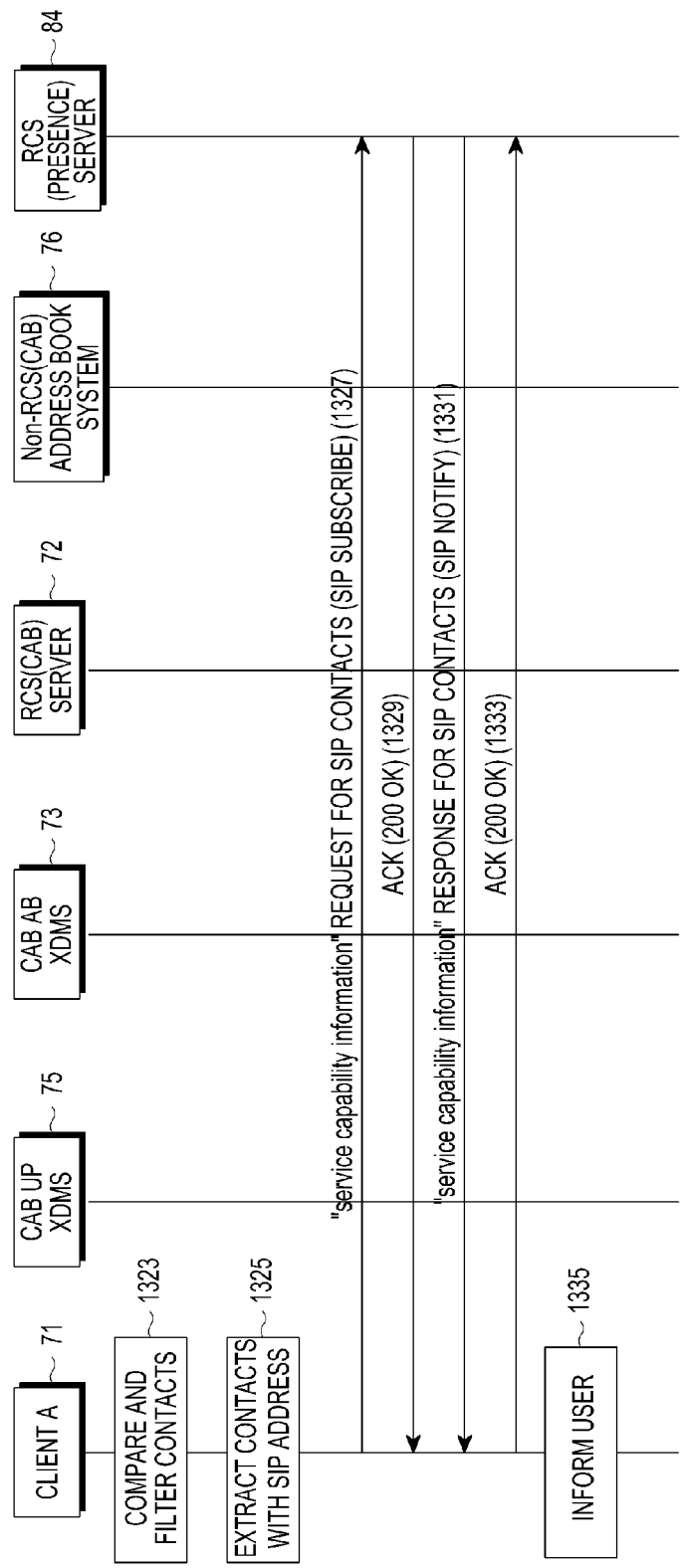

In the above-described fourth exemplary embodiment of the present invention, the entire analysis and filtering process has been performed by the RCS (CAB) server 72 in advance, by way of example. On the contrary, however, in a fifth exemplary embodiment of the present invention, the entire process may be performed by the RCS (CAB/Presence) client 71 at a later time, instead of being performed by the RCS (CAB) server 72 in advance. Reference will be made to FIGS. 13A and 13B to describe the fifth exemplary embodiment of the present invention.

FIGS. 13A and 13B are flow diagrams illustrating a process of providing contacts according to a fifth exemplary embodiment of the present invention.

Referring to FIGS. 13A and 13B, steps 1301 through 1313 in FIG. 13A are substantially equal in operation to steps 901 through 913 in FIG. 9A. In addition, steps 1315 through 1321 are also substantially equal in operation to steps 921 through 927 in FIG. 9A. However, while the contacts stored in step 921 are converted in the RCS (CAB) format, those stored in step 1315 are stored in the CAB UP XDMS 75 without undergoing additional analysis and filtering. Furthermore, although step 1323 in FIG. 13B is substantially equal in operation to step 919 in FIG. 9A, its filtering operation is performed by the RCS (CAB) client A 71 by comparing the existing contacts of the user A with contacts in its address book manager 507, instead of being performed by the RCS (CAB) server 72. Subsequent steps 1325 through 1335 in FIG. 13B are substantially equal in operation to steps 929 through 939 in FIG. 9B.

As is apparent from the foregoing description, according to exemplary embodiments of the present invention, an extended address book can be provided, contributing to extending the number of targets (or contacts), subscription/non-subscription of which to a specific service can be determined. Accordingly, a user can be automatically provided with new contacts which are not in his or her address book, and thus can easily make contact not only with the friends and family members in the address book, but also with the contacts, who are related to his or her profile, but whom he or she is not aware of. In addition, when having newly subscribed to a specific service, the user can enjoy the service right away, enhancing user conveniences. For example, if the service provider sends a join invite message, the user may not be interested in it. However, if a senior of a specific school finds an address of his or her school junior through the system proposed by the present invention and sends him or her a join invite message, then the junior is highly likely to join the service. Taking this into consideration, the service provider may easily induce many users having not subscribed to its service to subscribe to the service, contributing to a sharp increase in the number of its service subscribers.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for receiving a contact in a client terminal through interworking between a messaging service and a Social Network Service (SNS), the method comprising:

sending, by the client terminal, to a server a request for a contact list provided in the SNS;

receiving from the server, by the client terminal, the contact list from among a plurality of contact lists received from an SNS providing server; and performing, by the client terminal, address book synchronization with the server based on the received contact list, wherein the contact list is filtered by the server so as to include only contacts valid for the client terminal, and wherein, if an address of a same messaging service as that of the client terminal is present in the received contact list, the client terminal adds at least one contact having the address of the same messaging service as that of the client terminal in a subscription list.

2. The method of claim 1, wherein the contact list comprises at least one of a name, an e-mail address, and a phone number.

3. The method of claim 1, further comprising determining, by the client terminal, whether an address of the same messaging service as that of the client terminal is present in the received contact list.

4. The method of claim 1, further comprising:
sending a messaging service registration server a request for a messaging service list in which another party is registered, which corresponds to the at least one contact added in the subscription list; and
receiving the messaging service list from the messaging service registration server.

5. The method of claim 4, further comprising:
determining whether the same messaging service as that of the client terminal is present in the messaging service list; and
if the same messaging service as that of the client terminal is present in the messaging service list, notifying that a party corresponding to the at least one contact uses the same messaging service as that of the client terminal.

6. The method of claim 1, wherein the contact list is filtered by comparing the address book, received from a Converged Address Book (CAB) XML Document Management Server (XDMS), with a contact list received from the SNS.

7. A client terminal for receiving a contact through interworking between a messaging service and a Social Network Service (SNS), the client terminal comprising:
a processor executing instructions to:
send a server a request for a contact list provided in the SNS,
receive from the server the contact list from among a plurality of contact lists received from an SNS providing server,
perform address book synchronization for an address book with the server based on the received contact list, store the address book synchronized with the server, and control a user interface configured to inform a user whether a specific contact has subscribed to a the same messaging service as that of the user; and
an Input/Output (I/O) interface configured to exchange a request and a response with the server,
wherein the contact list is filtered by the server so as to include only contacts valid for the client terminal, and
wherein, if an address of a same messaging service as that of the client terminal is present in the received contact list, the client terminal adds at least one contact having the address of the same messaging service as that of the client terminal in a subscription list.

8. The client terminal of claim 7, wherein the contact list comprises at least one of a name, an e-mail address, and a phone number.

9. The client terminal of claim 7, further comprising:
a memory configured to temporarily store the received contact list,
wherein the client terminal determines whether an address of the same messaging service as that of the client terminal is present in the received contact list.

10. The client terminal of claim 7, wherein the client terminal sends a messaging service registration server a request for a messaging service list in which another party is registered, which corresponds to the at least one contact added in the subscription list, and receives the messaging service list from the messaging service registration server.

11. The client terminal of claim 10, wherein the client terminal determines whether the same messaging service as that of the client terminal is present in the messaging service list, and if the same messaging service as that of the client terminal is present in the messaging service list, notifies on the user interface that the another party corresponding to the at least one contact uses the same messaging service as that of the client terminal.

12. The client terminal of claim 7, wherein the contact list is filtered by comparing the address book received from a Converged Address Book (CAB) XML Document Management Server (XDMS) with a contact list received from the SNS.

13. The client terminal of claim 7, wherein the request for the contact list is converted in a format for the SNS and transmitted to the SNS through the server.

14. A method for providing a contact to a client terminal by a server through interworking between a messaging service and a Social Network Service (SNS), the method comprising:
receiving, by the server, a contact suggestion request for a new contact list from the client terminal, and storing the received contact suggestion request;
sending, by the server, a contact list request to an external non-converaed address book server;
receiving, by the server, a contact list in response to the contact list request from the external non-converged address book server;
filtering, by the server, the contact list so as to include only contacts valid for the client terminal by comparing the received contact list and an existing contact list;
sending, by the server, the filtered contact list to the client terminal; and
performing, by the server, address book synchronization with the client terminal,
wherein, if an address of a same messaging service as that of the client terminal is present in the filtered contact list sent to the client terminal, at least one contact having the address of the same messaging service as that of the client terminal is added by the client terminal in a subscription list.

15. The method of claim 14, wherein the receiving a contact suggestion request comprises receiving the contact suggestion request from a Converged Address Book (CAB) XML Document Management Server (XDMS) in which the client terminal has stored information about the contact suggestion request.

16. The method of claim 15, wherein the information about the contact suggestion request is stored using a HyperText Transfer Protocol (HTTP) PUT.

17. The method of claim 14, wherein the sending a contact list request comprises converting the contact list request into a format suitable for the external non-converged address book server before sending the contact list request.

18. The method of claim 17, wherein the external non-converged address book server is a server providing the SNS.

19. The method of claim 14, wherein the received contact list is converted into a Converged Address Book (CAB) format.

20. The method of claim 14, wherein the contact list is searched from an external non-converged address book system or a Converged Address Book (CAB) XML Document Management Server (XDMS).

21. The method of claim 14, wherein the identifying a contact corresponding to information about the contact suggestion request further comprises storing a contact filtered by comparing the existing address contact with the received contact list.

22. The method of claim 14, wherein the contact suggestion request is received using a Session Initiation Protocol (SIP) NOTIFY.

23. A server for providing a contact to a client terminal through interworking between a messaging service and a Social Network Service (SNS) comprising;
   an Input/Output (I/O) interface configured to:
      exchange a request and a response with the client terminal,
      receive a contact suggestion request for a new contact list from the client terminal,
      send a contact list request to an external non-converged address book server, and
      receive a contact list in response to the contact list request from the external non-converged address book server;
   a memory configured to store the received contact suggestion request; and
   a processor configured to:
      filter the contact list so as to include only contacts valid for the client terminal by comparing the received contact list and an existing contact list,
      send the filtered contact list to the client terminal, and
      perform address book synchronization with the client terminal,
   wherein, if an address of a same messaging service as that of the client terminal is present in the filtered contact list sent to the client terminal, at least one contact having the address of the same messaging service as that of the client terminal is added by the client terminal in a subscription list.

24. The server of claim 23, wherein the contact suggestion request is received from a Converged Address Book (CAB) XML Document Management Server (XDMS) in which the client terminal has stored information about the contact suggestion request.

25. The server of claim 24, wherein the information about the contact suggestion request is stored using a HyperText Transfer Protocol (HTTP) PUT.

26. The server of claim 23, wherein the processor converts the contact list request into a format suitable for the external non- converged address book server before sending the contact list request.

27. The server of claim 26, wherein the external non-converged address book server is a server providing the SNS.

28. The server of claim 23, wherein the received contact list is converted into a Converged Address Book (CAB) format.

29. The server of claim 23, wherein the processor searches a contact corresponding to information about the contact suggestion request from an external non-converged address book system or a Converged Address Book (CAB) XML Document Management Server (XDMS).

30. The server of claim 23, wherein the memory stores a contact filtered by comparing the existing address contact with the received contact list.

31. The server of claim 23, wherein the contact suggestion request is received using a Session Initiation Protocol (SIP) NOTIFY.

* * * * *